United States Patent
Kulkarni et al.

(10) Patent No.: US 11,028,727 B2
(45) Date of Patent: Jun. 8, 2021

(54) FOAMING NOZZLE OF A CLEANING SYSTEM FOR TURBINE ENGINES

(71) Applicant: General Electric Company, Schenectady, NY (US)

(72) Inventors: Ambarish Jayant Kulkarni, Schenectady, NY (US); Keith Anthony Lauria, Wells, NY (US); Michael Edward Eriksen, Cincinnati, OH (US); Nicole Jessica Tibbetts, Delanson, NY (US); Bernard Patrick Bewlay, Schenectady, NY (US); Byron Andrew Pritchard, Jr., Cincinnati, OH (US); Shantanu M. Sane, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 15/727,269

(22) Filed: Oct. 6, 2017

(65) Prior Publication Data

US 2019/0107005 A1     Apr. 11, 2019

(51) Int. Cl.
*F01D 25/00* (2006.01)
*B01F 5/04* (2006.01)
(Continued)

(52) U.S. Cl.
CPC ........ *F01D 25/002* (2013.01); *B01F 3/04248* (2013.01); *B01F 3/04446* (2013.01);
(Continued)

(58) Field of Classification Search
CPC ... B05B 7/0018; B05B 7/0025; B05B 7/0031; B05B 7/0037; B05B 7/0716
(Continued)

(56) References Cited

U.S. PATENT DOCUMENTS

| 472,198 A | * | 4/1892 | Nelson | B05B 7/0416 239/426 |
| 625,618 A | * | 5/1899 | Van Riper et al. | A62C 13/003 169/85 |

(Continued)

FOREIGN PATENT DOCUMENTS

| JP | 2007063998 | 3/2007 |
| WO | 02090482 | 11/2002 |

(Continued)

OTHER PUBLICATIONS

Engine Washing, Aviation Today, Oct. 1, 2006. http://www.aviationtoday.com/regions/ca/Engine-Washing_5248.html#.Vmszu78vuhu.

(Continued)

*Primary Examiner* — Viet Le
(74) *Attorney, Agent, or Firm* — Dority & Manning, P.A.

(57) ABSTRACT

A turbine engine cleaning system includes a foaming nozzle. The foaming nozzle includes a wall having a thickness between an outer surface of the wall and an inner surface of the wall. The outer surface of the wall is configured to contact a detergent in which the foaming nozzle is configured to be disposed. The inner surface of the wall surrounds an inner plenum of the foaming nozzle, and the inner plenum is configured to receive an aerating gas. The foaming nozzle also includes a first row of first through holes fluidly coupled to, and extending between, a first row of first through hole inlets at the inner surface of the wall and a first row of first through hole outlets at the outer surface of the wall. The foaming nozzle also includes a second row of second through holes disposed axially adjacent to the first row of second through holes with respect to a longitudinal axis of the inner plenum, where the second row of second through holes is fluidly coupled to, and extending between, a second row of second through hole inlets at the inner surface of the (Continued)

wall and a second row of second through hole outlets at the outer surface of the wall. The foaming nozzle also includes cross-sections of the first through holes and the second through holes having regular shapes.

25 Claims, 21 Drawing Sheets

(51) Int. Cl.
  *B01F 3/04* (2006.01)
  *B29C 64/10* (2017.01)
  *B05B 7/00* (2006.01)
  *B08B 3/00* (2006.01)
  *F02C 7/30* (2006.01)
  *B33Y 10/00* (2015.01)
  *B33Y 80/00* (2015.01)

(52) U.S. Cl.
  CPC .......... *B01F 5/0463* (2013.01); *B05B 7/0025* (2013.01); *B08B 3/003* (2013.01); *B29C 64/10* (2017.08); *F02C 7/30* (2013.01); *B01F 2003/04319* (2013.01); *B01F 2003/04361* (2013.01); *B01F 2215/004* (2013.01); *B33Y 10/00* (2014.12); *B33Y 80/00* (2014.12); *F05D 2220/32* (2013.01); *F05D 2260/607* (2013.01); *F05D 2300/612* (2013.01)

(58) Field of Classification Search
  USPC ............ 239/548, 553.5, 556, 557, 558, 568; 261/76, 77, 124
  See application file for complete search history.

(56) References Cited

U.S. PATENT DOCUMENTS

| | | | | |
|---|---|---|---|---|
| 643,396 A * | 2/1900 | Birdsall et al. | ........ | B01D 53/26 96/120 |
| 813,414 A * | 2/1906 | Fox | .......... | F02M 5/12 261/70 |
| 1,095,447 A * | 5/1914 | Becker | .......... | B05B 7/0416 239/398 |
| 1,241,664 A * | 10/1917 | Rustige | .......... | A62C 35/023 169/9 |
| 1,263,291 A * | 4/1918 | Schultz | .......... | A62C 35/023 169/9 |
| 1,296,671 A * | 3/1919 | Lawson | .......... | A62C 35/023 169/9 |
| 1,674,427 A * | 6/1928 | Freygang | .......... | A62C 99/0027 222/5 |
| 1,737,336 A * | 11/1929 | Sager | .......... | B01F 3/04496 261/123 |
| 1,798,345 A * | 3/1931 | Wager | .......... | A45D 27/10 261/75 |
| 1,923,654 A * | 8/1933 | Andreasen | .......... | B05B 7/0416 239/143 |
| 1,925,242 A * | 9/1933 | Gabbetis | .......... | A62C 3/08 169/58 |
| 2,050,771 A * | 8/1936 | Wait | .......... | C02F 1/78 210/192 |
| 2,099,828 A * | 11/1937 | Seat | .......... | A62C 13/003 169/85 |
| 2,106,043 A * | 1/1938 | Urquhart | .......... | A62C 5/002 261/76 |
| 2,138,133 A * | 11/1938 | Betzler | .......... | B01F 5/0406 261/76 |
| 2,164,153 A * | 6/1939 | Friedrich | .......... | B01F 5/0406 261/76 |
| 2,202,176 A * | 5/1940 | Timpson | .......... | A62C 3/06 261/76 |
| 2,210,846 A * | 8/1940 | Aghnides | .......... | E03C 1/084 239/428.5 |
| 2,241,337 A * | 5/1941 | Work | .......... | B01F 13/0283 261/77 |
| 2,305,796 A * | 12/1942 | Seidel | .......... | B01F 5/045 261/122.1 |
| 2,327,335 A * | 8/1943 | Boerner | .......... | B01F 5/0496 137/592 |
| 2,347,123 A * | 4/1944 | Riesgo | .......... | B67D 1/0802 138/39 |
| 2,570,669 A * | 10/1951 | Hannigan | .......... | E03C 1/084 239/403 |
| 2,637,541 A * | 5/1953 | Rubin | .......... | B01F 3/04262 261/122.1 |
| 2,651,373 A * | 9/1953 | Guise | .......... | A62C 13/006 406/137 |
| 2,755,865 A * | 7/1956 | Jacobs | .......... | A62C 13/74 169/85 |
| 2,764,246 A * | 9/1956 | Emmrich | .......... | A62C 5/002 169/77 |
| 2,774,583 A * | 12/1956 | Haftke | .......... | A62C 31/005 261/76 |
| 2,938,529 A * | 5/1960 | Olson | .......... | F16K 13/06 137/68.13 |
| 2,967,570 A * | 1/1961 | Nurkiewicz | .......... | A62C 31/005 169/70 |
| 2,967,698 A * | 1/1961 | Strohm | .......... | B01F 3/04446 261/76 |
| 2,990,885 A * | 7/1961 | Brazier | .......... | A62C 5/02 169/44 |
| 3,024,847 A * | 3/1962 | Vaughn | .......... | A62C 13/006 169/72 |
| 3,045,984 A * | 7/1962 | Cochran | .......... | B01F 5/0608 366/340 |
| 3,212,762 A * | 10/1965 | Carroll | .......... | B05B 7/24 261/124 |
| 3,301,935 A * | 1/1967 | Stoeckhert | .......... | B29C 44/5618 264/321 |
| 3,342,271 A * | 9/1967 | Anthony, Jr. | .......... | A62C 5/02 169/15 |
| 3,348,330 A * | 10/1967 | Gilliam | .......... | A01K 97/05 43/57 |
| 3,377,139 A * | 4/1968 | MacGregor | .......... | B29B 7/7414 422/133 |
| 3,593,964 A * | 7/1971 | Morane | .......... | B65D 83/205 366/340 |
| 3,595,443 A * | 7/1971 | Jones | .......... | B05B 7/0012 222/136 |
| 3,618,856 A * | 11/1971 | Sachnik | .......... | A01G 13/0287 239/8 |
| 3,633,822 A * | 1/1972 | Hruby, Jr. | .......... | B05B 7/0416 239/17 |
| 3,696,929 A * | 10/1972 | Shah | .......... | C02F 1/72 210/199 |
| 3,701,482 A * | 10/1972 | Sachnik | .......... | B05B 7/0056 239/590.3 |
| 3,703,345 A * | 11/1972 | Giesemann | .......... | B29B 7/7419 425/4 R |
| 3,764,271 A * | 10/1973 | Brumfield | .......... | A61M 1/32 422/46 |
| 3,769,162 A * | 10/1973 | Brumfield | .......... | A61M 1/32 435/2 |
| 3,830,307 A * | 8/1974 | Bragg | .......... | A62C 3/06 169/9 |
| 3,836,076 A * | 9/1974 | Conrad | .......... | A01G 13/065 239/8 |
| 3,979,326 A * | 9/1976 | Chatterton | .......... | A01M 7/0092 261/75 |
| 4,067,696 A * | 1/1978 | Curtis | .......... | A61M 1/32 128/DIG. 3 |
| 4,092,803 A * | 6/1978 | Naylor | .......... | A01G 27/008 239/554 |
| 4,133,773 A | 1/1979 | Simmons | | |
| 4,183,787 A * | 1/1980 | Roesler | .......... | B01F 15/00525 435/43 |
| 4,201,691 A * | 5/1980 | Asher | .......... | B01D 61/40 261/124 |

(56) References Cited

U.S. PATENT DOCUMENTS

| | | | | |
|---|---|---|---|---|
| 4,213,936 A * | 7/1980 | Lodrick | B05B 12/008 | 422/133 |
| 4,281,423 A * | 8/1981 | Fukunaga | A61H 33/02 | 261/124 |
| 4,426,450 A * | 1/1984 | Donofrio | C12M 21/12 | 261/124 |
| 4,473,185 A * | 9/1984 | Peterson | B05B 7/0475 | 239/8 |
| 4,514,343 A * | 4/1985 | Cramer | B01F 3/04588 | 210/221.2 |
| 4,599,208 A * | 7/1986 | Blaak | B01F 7/00808 | 261/83 |
| 4,674,888 A * | 6/1987 | Carlson | B01F 3/04262 | 162/57 |
| 4,711,277 A * | 12/1987 | Clish | B65B 3/22 | 141/311 A |
| 4,735,709 A * | 4/1988 | Zipperian | B01F 3/04262 | 209/164 |
| 4,802,630 A * | 2/1989 | Kromrey | B01F 5/0413 | 239/428 |
| 4,805,700 A * | 2/1989 | Hoover | A62C 31/12 | 169/14 |
| 4,830,790 A * | 5/1989 | Stevenson | B01F 5/0408 | 169/15 |
| 4,869,849 A * | 9/1989 | Hirose | B01F 5/0682 | 261/78.2 |
| 4,897,359 A * | 1/1990 | Oakley | C12M 23/24 | 261/122.1 |
| 4,981,178 A * | 1/1991 | Bundy | A62C 5/02 | 169/13 |
| 5,012,979 A * | 5/1991 | Williams | A62C 31/03 | 239/416.5 |
| 5,057,174 A * | 10/1991 | Anderson | B24C 1/00 | 156/155 |
| 5,085,371 A * | 2/1992 | Paige | B05B 7/0062 | 239/343 |
| 5,113,945 A * | 5/1992 | Cable | A62C 5/02 | 169/14 |
| 5,238,155 A * | 8/1993 | Blake, III | A45D 27/10 | 222/190 |
| 5,254,292 A * | 10/1993 | Gabryelczyk | B01D 19/0042 | 166/267 |
| 5,275,763 A * | 1/1994 | Fukai | A62C 5/02 | 169/15 |
| 5,344,079 A * | 9/1994 | Tasaki | B05B 11/0005 | 239/498 |
| 5,356,565 A * | 10/1994 | Southwell | B01F 5/0406 | 166/309 |
| 5,411,183 A * | 5/1995 | Hildebrandt | B05B 7/0025 | 141/113 |
| 5,492,655 A * | 2/1996 | Morton | B01F 5/0268 | 261/76 |
| 5,538,027 A * | 7/1996 | Adamson | A62C 31/12 | 137/101.11 |
| 5,588,596 A * | 12/1996 | Hartfield | B01D 1/04 | 165/117 |
| 5,616,288 A * | 4/1997 | McDonald | B01F 3/0451 | 261/76 |
| 5,651,879 A * | 7/1997 | Gonzalez | B03D 1/1418 | 162/4 |
| 5,661,117 A | 8/1997 | Dufresne | | |
| 5,769,135 A * | 6/1998 | Mahlich | A47J 31/4489 | 141/70 |
| 5,837,168 A * | 11/1998 | Rowe | B01F 5/0663 | 261/78.2 |
| 5,857,623 A * | 1/1999 | Miller | A62C 31/02 | 239/252 |
| 5,899,217 A | 5/1999 | Testman, Jr. | | |
| 5,901,906 A * | 5/1999 | Bouldin | E04H 4/1681 | 134/167 R |
| 5,938,079 A * | 8/1999 | Wacker | B29B 7/7404 | 222/108 |
| 5,947,383 A * | 9/1999 | Faustmann | F23D 14/46 | 239/132.3 |
| 5,960,887 A * | 10/1999 | Crabtree | A62C 31/12 | 169/14 |
| 5,964,378 A * | 10/1999 | Sperry | B29B 7/7678 | 141/105 |
| 5,970,574 A | 10/1999 | Thrash, Jr. | | |
| 5,996,699 A * | 12/1999 | Sundholm | A62C 35/023 | 169/9 |
| 6,012,652 A * | 1/2000 | Holtan | B01J 8/1827 | 239/430 |
| 6,019,895 A * | 2/2000 | Dupre | C02F 1/74 | 210/170.06 |
| D422,055 S | 3/2000 | Stasny et al. | | |
| 6,086,052 A * | 7/2000 | Rowe | A62C 5/02 | 169/14 |
| 6,112,819 A * | 9/2000 | Henry | A62C 5/02 | 169/14 |
| 6,118,000 A | 9/2000 | Frenier | | |
| 6,149,293 A * | 11/2000 | Pavese | B01F 3/0819 | 366/119 |
| 6,179,997 B1 * | 1/2001 | Vedder, Jr. | B05B 7/0416 | 208/113 |
| 6,217,009 B1 * | 4/2001 | Rowe | A62C 5/02 | 169/44 |
| 6,311,704 B1 | 11/2001 | Foster | | |
| 6,318,474 B1 * | 11/2001 | Sundholm | A62C 31/02 | 169/37 |
| 6,325,305 B1 * | 12/2001 | Kuhlman | E21B 37/00 | 166/222 |
| 6,478,033 B1 * | 11/2002 | Foster | C11D 3/0073 | 134/22.1 |
| 6,491,048 B1 | 12/2002 | Foster | | |
| 6,503,334 B2 | 1/2003 | Ruiz et al. | | |
| 6,521,028 B1 | 2/2003 | Frenier | | |
| 6,662,600 B1 * | 12/2003 | Field | D06F 39/02 | 134/102.1 |
| 6,702,033 B1 * | 3/2004 | Mitchell | A62C 35/023 | 169/85 |
| 6,708,902 B2 * | 3/2004 | Takeshi | B05B 7/005 | 239/428.5 |
| 6,719,222 B2 * | 4/2004 | Mebberson | B29C 51/26 | 239/548 |
| 6,905,610 B2 * | 6/2005 | Turchet | B01F 3/0876 | 210/221.2 |
| 7,318,484 B2 * | 1/2008 | Rousseau | A62C 13/003 | 169/77 |
| 7,377,499 B2 * | 5/2008 | Pakdaman | B01F 3/04262 | 261/122.1 |
| 7,451,830 B2 * | 11/2008 | Dierker, Jr. | A62C 3/07 | 169/62 |
| 7,494,073 B2 | 2/2009 | Pivovarov | | |
| 7,531,048 B2 * | 5/2009 | Woodcock | B08B 9/00 | 123/198 A |
| 7,594,593 B2 * | 9/2009 | Mancel | B05B 12/0022 | 222/135 |
| 7,622,040 B2 * | 11/2009 | Mitchell | B01F 3/04262 | 210/170.05 |
| 8,057,607 B2 | 11/2011 | Gardner et al. | | |
| 8,192,073 B1 * | 6/2012 | Waldron | B01F 3/0807 | 138/40 |
| 8,282,377 B2 * | 10/2012 | Higashi | B29C 64/20 | 425/174.4 |
| 8,308,869 B2 | 11/2012 | Gardner et al. | | |
| 8,360,339 B2 * | 1/2013 | Henry | A62C 5/022 | 239/8 |
| 8,517,217 B2 * | 8/2013 | Kraus | B65D 83/70 | 169/9 |
| 8,524,011 B2 | 9/2013 | Gardner et al. | | |
| 8,628,627 B2 | 1/2014 | Sales et al. | | |
| 8,728,246 B2 | 5/2014 | Varrin, Jr. et al. | | |
| 8,763,855 B1 | 7/2014 | Harvey et al. | | |
| 8,807,233 B2 * | 8/2014 | Peltola | A62C 31/22 | 169/45 |
| 8,808,497 B2 * | 8/2014 | Duesel, Jr. | B01D 1/0005 | 159/16.1 |

(56) References Cited

U.S. PATENT DOCUMENTS

| | | | |
|---|---|---|---|
| 8,871,090 B2 | 10/2014 | Livshits et al. | |
| 8,899,557 B2* | 12/2014 | Cullinane | B01D 19/0036 |
| | | | 261/76 |
| 8,919,391 B1 | 12/2014 | Harvey et al. | |
| D723,141 S * | 2/2015 | Furuno | D23/266 |
| 9,347,405 B2* | 5/2016 | Jung | F02M 27/00 |
| 9,370,675 B1* | 6/2016 | Rowe | A62C 5/022 |
| 10,099,078 B1* | 10/2018 | Blanchat | A62C 5/022 |
| 10,384,218 B2* | 8/2019 | Mezhericher | B05B 7/0416 |
| 10,507,442 B2* | 12/2019 | Gordon | B01F 13/1016 |
| 10,519,900 B2* | 12/2019 | Chan | B01F 5/0691 |
| 2003/0010506 A1* | 1/2003 | Braun | A62C 5/02 |
| | | | 169/14 |
| 2003/0080445 A1* | 5/2003 | Howe | A01N 25/16 |
| | | | 261/72.1 |
| 2003/0089799 A1* | 5/2003 | Kanno | B01F 3/04049 |
| | | | 239/434 |
| 2004/0213079 A1* | 10/2004 | Virtanen | B01F 3/04453 |
| | | | 366/101 |
| 2005/0077636 A1* | 4/2005 | Bortkevitch | B01F 3/0446 |
| | | | 261/76 |
| 2006/0102756 A1* | 5/2006 | Calvin | B05B 15/654 |
| | | | 239/587.3 |
| 2006/0144966 A1* | 7/2006 | Schwegler | B05B 7/0416 |
| | | | 239/554 |
| 2006/0219269 A1 | 10/2006 | Rice et al. | |
| 2007/0114046 A1* | 5/2007 | Munroe | A62C 35/62 |
| | | | 169/16 |
| 2007/0125520 A1* | 6/2007 | Nutsos | B60H 3/0085 |
| | | | 165/95 |
| 2007/0176028 A1* | 8/2007 | Laidler | B05B 1/3006 |
| | | | 239/589 |
| 2008/0217026 A1* | 9/2008 | Hursey | A62C 5/02 |
| | | | 169/15 |
| 2008/0245282 A1* | 10/2008 | Richards | A62C 5/02 |
| | | | 111/127 |
| 2008/0277426 A1* | 11/2008 | van der Heijden | A47K 5/14 |
| | | | 222/190 |
| 2009/0121038 A1* | 5/2009 | Wurz | B05B 7/0458 |
| | | | 239/8 |
| 2009/0140444 A1* | 6/2009 | Smith | B01F 3/0446 |
| | | | 261/77 |
| 2010/0032175 A1* | 2/2010 | Boyd | A62C 3/02 |
| | | | 169/44 |
| 2010/0276517 A1* | 11/2010 | Alansary | B05B 7/0416 |
| | | | 239/399 |
| 2010/0314137 A1* | 12/2010 | Jackson | A62C 5/02 |
| | | | 169/15 |
| 2011/0127347 A1* | 6/2011 | Worthy | B05B 7/0416 |
| | | | 239/8 |
| 2012/0247790 A1* | 10/2012 | Young | A62C 5/02 |
| | | | 169/14 |
| 2013/0037277 A1* | 2/2013 | Henry | B01F 5/0428 |
| | | | 169/14 |
| 2013/0069256 A1* | 3/2013 | Garrioch | B01F 3/04241 |
| | | | 261/122.1 |
| 2013/0142700 A1* | 6/2013 | Parimi | B01J 19/2485 |
| | | | 422/149 |
| 2014/0034091 A1* | 2/2014 | Dorshimer | B08B 3/02 |
| | | | 134/34 |
| 2014/0087457 A1* | 3/2014 | Goodwin | B01F 3/04269 |
| | | | 435/325 |
| 2014/0144473 A1 | 5/2014 | Martin | |
| 2014/0263047 A1* | 9/2014 | Silva | C02F 3/223 |
| | | | 210/629 |
| 2014/0332989 A1* | 11/2014 | Alenzi | B01F 7/00033 |
| | | | 261/76 |
| 2015/0013769 A1* | 1/2015 | Saunders | B05B 7/0491 |
| | | | 137/1 |
| 2015/0048176 A1* | 2/2015 | Jones | A62C 5/008 |
| | | | 239/8 |
| 2015/0125351 A1* | 5/2015 | Fedorov | B01J 8/44 |
| | | | 422/129 |
| 2015/0159122 A1 | 6/2015 | Tibbetts et al. | |
| 2015/0273498 A1* | 10/2015 | Yaita | B05B 7/0433 |
| | | | 239/398 |
| 2015/0285094 A1 | 10/2015 | Tibbetts et al. | |
| 2016/0108899 A1* | 4/2016 | Favy | F03G 7/05 |
| | | | 60/641.7 |
| 2016/0144212 A1* | 5/2016 | Hurme | B05B 1/00 |
| | | | 169/46 |
| 2016/0186602 A1 | 6/2016 | Saenz | |
| 2016/0230592 A1* | 8/2016 | Saenz | B01F 7/00558 |
| 2017/0014005 A1* | 1/2017 | Blanchat | A47K 5/14 |
| 2017/0120092 A1* | 5/2017 | Haider | B01F 3/04446 |
| 2017/0203312 A1* | 7/2017 | Mezhericher | B05B 1/005 |
| 2017/0266475 A1* | 9/2017 | Mahrt | A62C 5/022 |
| 2018/0027875 A1* | 2/2018 | Rostami | H05B 3/42 |

FOREIGN PATENT DOCUMENTS

| | | |
|---|---|---|
| WO | 2007102738 | 9/2007 |
| WO | 2015051146 | 4/2015 |

OTHER PUBLICATIONS

Kumar, P.G.S.; "Dry Ice leaning to Improvise Dielectric Features of High Voltage Windings in Turbine Generators", 1st International Conference on Condition Assessment Techniques in Electrical Systems (CATCON), http://ieeexplore.ieee.org/document/6737468/, Dec. 6-8, 2013.

Yuyang, Jin, et al.; "Topological structure design of cleaning manipulator for aircraft surfaces based on single-open-chain", International Conference on Mechatronic Sciences, Electric Engineering and Computer (MEC), Proceeding, http://ieeexplore.ieee.org/document/6885170/, Dec. 20-22, 2013.

"Gas Turbine Cleaning", Engine Cleaning Technology, Inc.; downloaded Dec. 2016; https://www.ectinc.net/industrialGasTurbine.html.

"On-Wing Washing System Using Injected Water or Detergent Which Penetrates Deep into the Engine, Cleaning Performance Stealing Contaminants", Aero Jet Wash L.L.C.; downloaded Dec. 2016; http://www.aerojetwash.com/services.html.

Deb, Dipankar, et al.; "Automated Cleaning of Wind Turbine Blades with no Downtime", IEEE International Conference on Industrial Technology (ICIT), http://ieeexplore.ieee.org/document/7913263/, Mar. 22-25, 2017.

* cited by examiner

US 11,028,727 B2

FOAMING NOZZLE OF A CLEANING SYSTEM FOR TURBINE ENGINES

BACKGROUND

The subject matter disclosed herein relates to cleaning of turbine engines. More specifically, the present disclosure relates to a foaming nozzle of a turbine engine cleaning system.

Gas turbine engines (e.g., aircraft engines) typically combust a mixture of carbonaceous fuel and compressed oxidant to generate high temperature, high pressure combustion gases. The combustion gases drive a turbine, which is coupled via a shaft to a compressor. In some embodiments, the shaft may also be coupled to an electrical generator. In such embodiments, as the combustion gases drive the turbine and corresponding shaft into rotation, the shaft outputs power to the electrical generator. In aircraft engines, the combustion gases may pass through the turbine and through a nozzle, causing the exhaust gas exiting the nozzle to produce thrust.

Unfortunately, turbine engines are generally susceptible to deposits or contaminants, such as dust in particular, which may reduce efficiency and/or effectiveness of the turbine engine. Generally, the deposits and contaminants may be formed or may gather in any component of the turbine engine, including but not limited to the compressor, the combustor or combustion chamber, and the turbine. Unfortunately, traditional cleaning systems and methods may be poorly equipped to remove a substantial amount of the contaminants in a short amount of time. Accordingly, improved cleaning systems and methods are needed for gas turbine engines.

BRIEF DESCRIPTION

In one embodiment, a turbine engine cleaning system includes a foaming nozzle. The foaming nozzle includes a wall having a thickness between an outer surface of the wall and an inner surface of the wall. The outer surface of the wall is configured to contact a detergent in which the foaming nozzle is configured to be disposed. The inner surface of the wall surrounds an inner plenum of the foaming nozzle, and the inner plenum is configured to receive an aerating gas. The foaming nozzle also includes a first row of first through holes fluidly coupled to, and extending between, a first row of first through hole inlets at the inner surface of the wall and a first row of first through hole outlets at the outer surface of the wall. The foaming nozzle also includes a second row of second through holes disposed axially adjacent to the first row of second through holes with respect to a longitudinal axis of the foaming nozzle, where the second row of second through holes is fluidly coupled to, and extending between, a second row of second through hole inlets at the inner surface of the wall and a second row of second through hole outlets at the outer surface of the wall. The foaming nozzle includes cross-sections of the first through holes and the second through holes having regular shapes.

In another embodiment, a method of generating foam bubbles to clean a turbine engine includes immersing a foaming nozzle within a detergent, routing an aerating gas to an inner plenum of the foaming nozzle, and distributing the aerating gas from the inner plenum to a first row of first radial jets via a first row of first inlets disposed at an inner surface of the foaming nozzle surrounding the inner plenum. The method also includes distributing the aerating gas from the inner plenum to a second row of second radial jets via a second row of second inlets disposed at the inner surface of the foaming nozzle, where the second row of second radial jets is disposed axially adjacent to the first row of first radial jets with respect to a longitudinal axis of the foaming nozzle, where the first row of first radial jets includes a first regular cross-sectional shape, and where the second row of second radial jets includes a second regular cross-sectional shape.

In another embodiment, a method of manufacturing a turbine engine cleaning system includes additively manufacturing a foaming nozzle of the turbine engine cleaning system. Additively manufacturing the foaming nozzle of the turbine engine cleaning system includes constructing a wall of the foaming nozzle such that the wall includes an inner surface extending circumferentially about an inner plenum of the foaming nozzle, and such that the wall includes an outer surface configured to contact a detergent, where the inner plenum is configured to receive an aerating gas, and where a thickness of the wall between the inner surface and the outer surface extends perpendicular to a longitudinal axis of the foaming nozzle. Additively manufacturing the foaming nozzle also includes forming the wall about a first row of first radial jets such that the first row of first radial jets extends between the inner surface of the wall and the outer surface of the wall, such that the first row of first radial jets is in fluid communication with the inner plenum, and such that each first radial jet comprises a first regular cross-sectional shape.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
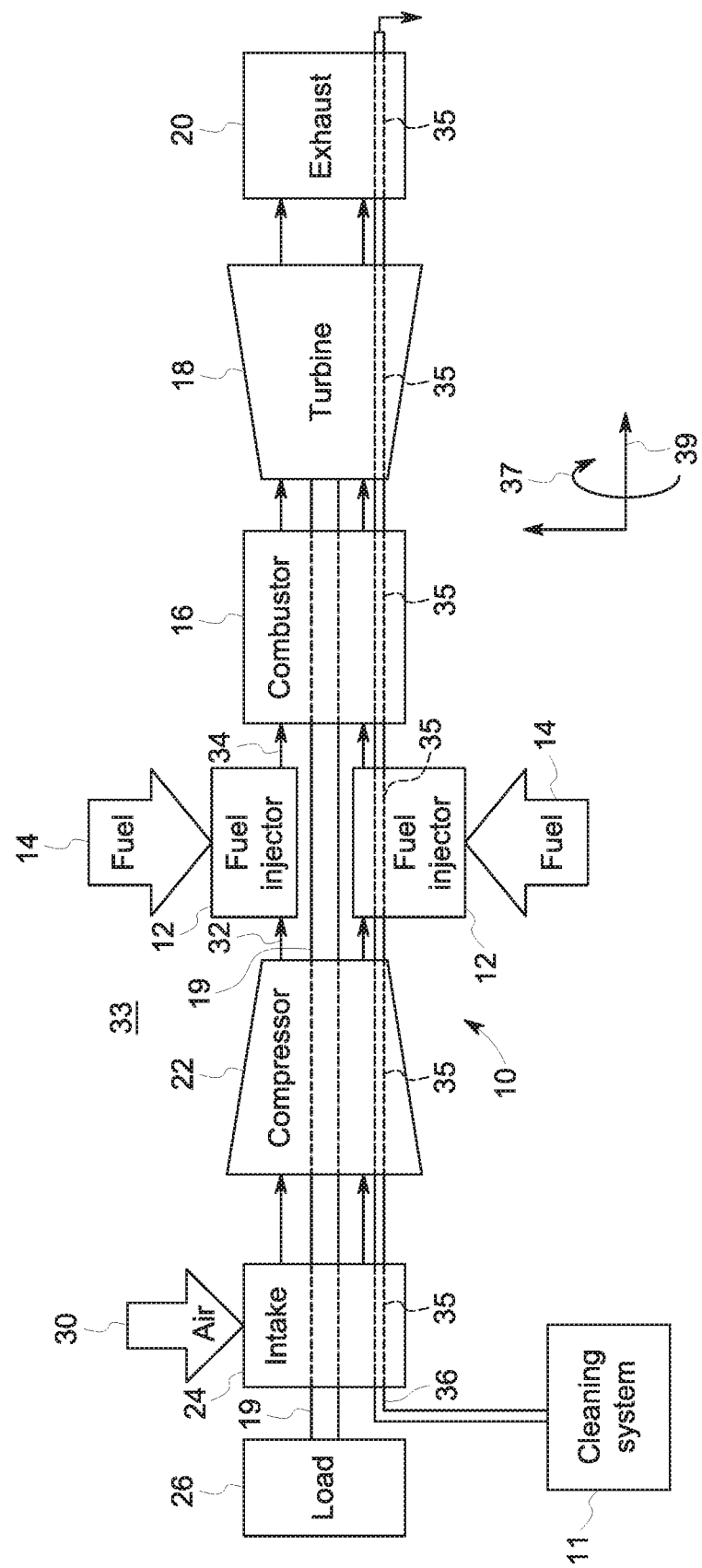
FIG. 1 is a cross-sectional schematic view of an embodiment of a turbine system and a cleaning system, in accordance with an aspect of the present disclosure.

The present disclosure relates to gas turbine engine cleaning systems and methods. More particularly, the present disclosure relates to a foaming nozzle of a gas turbine cleaning system.

Gas turbine engines (e.g., aircraft engines) typically combust a mixture of carbonaceous fuel and compressed oxidant to generate high temperature, high pressure combustion gases, which are utilized in a number of ways depending on the type of gas turbine engine. For example, the combustion products may cause components of the gas turbine engine to output power to an electrical generator. Additionally or alternatively, the combustion products may pass through a nozzle (e.g., in an aero-derivative turbine engine) to produce thrust.

Unfortunately, gas turbine engines are generally susceptible to deposits or contaminants, such as dust in particular, which may reduce efficiency and/or effectiveness of the turbine engine. Generally, the deposits and contaminants may be formed or may gather in any component of the turbine engine, including but not limited to the compressor, the combustor or combustion chamber, and the turbine.

In accordance with present embodiments, a gas turbine cleaning system may include a foaming nozzle that passes an aerating gas therethrough and into a chamber having detergent (e.g., liquid detergent) therein. The foaming nozzle may include jets having regularly-shaped cross-sections (e.g., circular cross-sections, elliptical cross-sections, hexagonal cross-sections, square cross-sections, triangular cross-sections, star cross-sections, etc.), where the jets extend from an inner plenum of the foaming nozzle toward outlets at an outer surface of the foaming nozzle. As the aerating gas passes from the inner plenum to the jets and exits the jets at the outlets, the aerating gas intermixes with the liquid detergent proximate the outlets to form bubbles. The bubbles may then be passed to components of the gas turbine engine during a cleaning operation/mode, where the bubbles contact the contaminants or deposits gathered in the components of the gas turbine engine. As the bubbles soak the contaminants on the gas turbine engine components, the bubbles may remove the contaminants from surfaces of the gas turbine engine components. Additionally, the bubbles may at least partially collapse. After a soaking period, the effluent (e.g., combination of contaminants and partially or fully collapsed bubbles) may be removed (e.g., rinsed) from the gas turbine engine.

In accordance with present embodiments, the foaming nozzle may include, as previously described, jets extending between an inner surface that defines the inner plenum (e.g., the inner surface extends circumferentially about the inner plenum) and an outer surface of the nozzle. Further, as previously described, the jets may include regular cross-sectional shapes. For example, the foaming nozzle may be three-dimensionally printed ("3-D printed") or otherwise manufactured to include the regular cross-sectional shapes. The regular cross-sectional shapes of the jets may improve a flow of aerating gas through the jets (e.g., over traditional embodiments having irregular shapes), which improves aeration of the liquid detergent, thereby enabling a more uniform distribution of bubble size (e.g., bubble diameter) of the bubbles generated for cleaning the gas turbine engine. In contrast, traditional foaming nozzles may be manufactured using other techniques, such as powder-pressing, which may form irregularly shaped jet cross-sections, or interstices. Indeed, traditional foaming nozzles may include irregular interstices in the bulk of the foaming nozzle, and on the surface of the foaming nozzle. Further, traditional foaming nozzles may include variable porosity from part to part, which decreases a bubble-size consistency of the foam produced by the traditional foaming nozzles. Further still, traditional foaming nozzles may include variable surface finish on the external surface of the foaming nozzle. The irregular interstices, the variable porosity, and the variable surface finish referenced above may lead to imprecise aeration of the liquid detergent in traditional embodiments, which may degrade bubble size uniformity.

In contrast, the foaming nozzle in accordance with the present disclosure may include jets with uniform/regular size and/or shape, and may include inlets to the jets and outlets from the jets having uniform/regular size and/or shape. The nozzle may be manufactured to include a total porosity (e.g., in view of a total number of orifices or jets) that enhances uniformity of the generated bubbles. Further, the jets may be particularly oriented to enhance bubble generation. Further still, the surface finish of the jets and of the outer surface of the foaming nozzle may enhance bubble generation (and may be enabled by the manufacturing techniques that differ from traditional embodiments). By enhancing a uniformity of bubble size via the disclosed foaming nozzle, cleaning effectiveness and efficiency of the gas turbine engine may be improved.

Further to the points above, and in accordance with the present disclosure, the foaming nozzle may be manufactured to include rows of jets having particular orientations and/or geometries between the inner surface of the foaming nozzle and the outer surface of the foaming nozzle. For example, the jets may be disposed in rows at axial positions/layers of the foaming nozzle with respect to a longitudinal axis extending through the inner plenum from the inlet section of the foaming nozzle. The jets of a particular row may be similarly configured/oriented. In some embodiments, adjacent rows of jets may also include similarly configured/oriented jets with respect to each other, while in other embodiments, one row of the jets may include a first type of jet and another row of jets may include a second, different type of jet. Indeed, each jet may include radial vectors with respect to the longitudinal axis, axial vectors with respect to the longitudinal axis, and/or other features (e.g., offsets from the longitudinal axis such that the jets of a particular row "swirl" in a clockwise or counterclockwise direction). It should be noted that the terms "radial jets" and "axial jets" may be utilized throughout the description below with respect to the drawings. "Radial jets" refers to jets having a radial vector (or "component"), but does not preclude the jets from having an axial vector (or "component"). Likewise, "axial jets" refers to jets having an axial vector (or "component"), but does not preclude the jets from having a radial vector (or "component"). The term "purely radial jets" refers to jets which extend only in a radial direction and without an offset angle from a longitudinal axis of the foaming nozzle (as will be described in detail below with reference to the drawings). "Purely axial jets" are utilized to refer to jets that include only an axial vector.

Because the foaming nozzle of the present disclosure is 3-D printed or otherwise manufactured with precision, design of the jets of the foaming nozzle may be controlled to improve bubble generation for cleaning the gas turbine engine. Particular designs may be associated with particular effects that improve bubble generation. These and other features will be described in detail below with reference to the drawings.

Turning now to the drawings, FIG. 1 is a block diagram of a turbine system 10 and a cleaning system 11 configured to clean the turbine system 10. The turbine system 10 includes a fuel injector 12, a fuel supply 14, a combustor 16, and a turbine 18. As illustrated, the fuel supply 14 routes a liquid fuel and/or gas fuel, such as natural gas, to the gas turbine system 10 through the fuel injector 12 and into the combustor 16. As discussed below, the fuel injector 12 is configured to inject and mix the fuel with compressed air. The combustor 16 ignites and combusts the fuel-air mixture, and then passes hot pressurized exhaust gas into the turbine 18. As will be appreciated, the turbine 18 includes one or more stators having fixed vanes or blades, and one or more rotors having blades which rotate relative to the stators. The exhaust gas passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the exhaust of the combustion process may exit the gas turbine system 10 via an exhaust outlet 20. In some embodiments, the gas turbine system 10 may be a gas turbine system of an aircraft, in which the exhaust outlet 20 may be a nozzle through which the exhaust gases are accelerated. Acceleration of the exhaust gases through the exhaust outlet 20 (e.g., the nozzle) may provide thrust to the aircraft. As described below, the shaft 19 (e.g., in an aircraft gas turbine system 10) may be coupled to a propeller, which may provide thrust to the aircraft in addition to, or in place of, the exhaust gases accelerated through the exhaust outlet 20 (e.g., the nozzle).

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane as previously described, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

The turbine system 10 may be susceptible to gathering of deposits or contaminants, namely dust, within components of the turbine system 10. Accordingly, as illustrated, the turbine system 10 includes the cleaning system 11 fluidly coupled to at least one component of the turbine system 10, namely, the air intake(s) 24, the compressor 22, the fuel injector(s) 12, the combustor(s) 16, the turbine 18, and/or the exhaust outlet 20. In some embodiments, the cleaning system 11 may be physically coupled to only one component or one group of components of the gas turbine system 10, such as to the air intake or intakes 24, or to the compressor 22. For example, although the components of the turbine system 10 are shown separate from one another in the illustrated embodiment, the components may be integral with each other or coupled together such that a fluid passageway 35 extends through inner portions of all the components.

The fluid passageway 35 may be substantially continuous through the components and/or may be at least partially sealed from an environment 33 outside the gas turbine system 10. Although the fluid passageway 35 is shown on only a bottom portion of the illustrated gas turbine system 10, the fluid passageway 35 may be an annular passageway extending in an annular direction 37 about a longitudinal direction 39 (or axis) of the gas turbine system 10. The cleaning system 11 may be physically coupled to one of the components (e.g., a first of the components, such as the air intake[s] 24 or the compressor 22) at an inlet 36, such that the cleaning system 11 is fluidly coupled to the fluid passageway 35 at the inlet 36. It should be noted that, in some embodiments, the cleaning system 11 may include a delivery system or manifold that is coupled to a number of inlets to the gas turbine system 10 (e.g., an engine inlet). For example, the delivery system or manifold of the cleaning system 11 may deliver cleaning agents (e.g., a detergent based foam), as described below, to inlets of the gas turbine system 10 (e.g., engine inlets) and to other inlets that are also used for borescope injection, as fuel injection nozzles, for igniter plugs, or any other suitable inlets. Further, by way of introducing the detergent based foam to the fluid passageway 35 through one or more inlets to the fluid passageway 35 (e.g., through borescope inspection ports, through igniter plug inlets, through fuel nozzles, etc.) the detergent based foam may pass over compressor blades, compressor vanes, through the compressor, through and/or outside of the turbine, and through cooling circuits of the turbine system 10.

The cleaning system 11 in FIG. 1 is configured to generate, and provide to the component(s) of the gas turbine system 10, a detergent based foam that loosens, soaks, absorbs, and/or cleans the deposits or contaminants, namely dust, within the components of the gas turbine system 10.

The cleaning system 11 may also include components configured to rinse the gas turbine system 10 after the detergent based foam soaks the insides of the components of the gas turbine system 10 for a defined period of time. As will be appreciated in light of the discussion below, components of the cleaning system 11 may be configured to generate a detergent based foam having particular characteristics that enable desired cleaning effects. For example, in accordance with present embodiments, a foaming nozzle of the cleaning system 11 may be made (e.g., 3-D printed) to include jets (e.g., radial jets) having regularly shaped cross-sections that deliver an aerating gas to a foaming chamber having detergent (e.g., liquid detergent) in which the foaming nozzle is immersed (e.g., partially or fully), such that the aerating gas aerates the detergent (e.g., adjacent to an outer surface of the foaming nozzle) to generate foam bubbles. The jets may include, for example, circular cross-sections, elliptical cross-sections, or oval cross-sections, and may enable an improved distribution (e.g., more consistent) bubble size compared to traditional embodiments (e.g., such as traditional powder-pressed nozzles that include irregular gas delivery passages). It should also be noted that, by way of the improved distribution of aerating gas through the improved regularly-shaped cross-sections of the jets, system-level metering of the aerating gas may be improved. For example, certain embodiments may include several foaming nozzles. By improving the consistency of the aeration by each foaming nozzle, metering of the aerating gas may be more predictable, which improves overall efficiency of the system (e.g., by improving an effectiveness [cleaning] of the output [bubbles] and by conserving the input [aerating gas, liquid detergent, and/or water]). These and other features (e.g., orientations/configurations of the jets) will be described in detail below.

Figure 2:
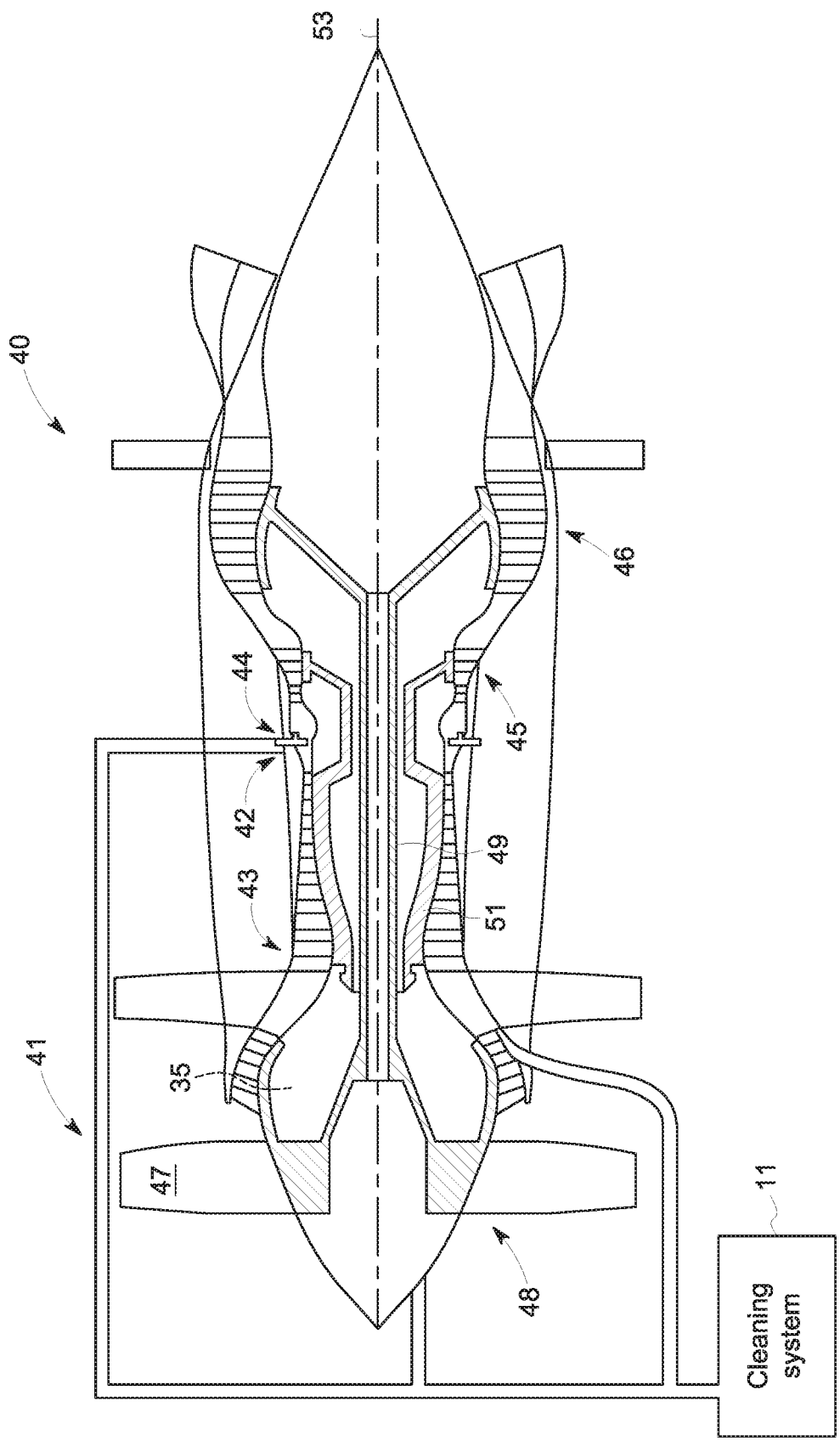
FIG. 2 is a cross-sectional schematic view of an embodiment of an aircraft gas turbine system and a cleaning system, in accordance with an aspect of the present disclosure.

FIG. 2 illustrates a cross-sectional schematic view of an embodiment of the cleaning system 11 and an aircraft gas turbine engine 40 (e.g., aero-derivative gas turbine engine) that includes a fan assembly 41 and a core engine 42 including a high pressure compressor 43, a combustor 44, a high-pressure turbine (HPT) 45, and a low-pressure turbine (LPT) 46. In general, the cleaning system 11 may be equipped with the foaming nozzle of the present disclosure (e.g., having jets with regularly shaped cross-sections), as previously described. The illustrated aircraft gas turbine engine 40 may be an example of the gas turbine engine 10 illustrated in FIG. 1. In the illustrated embodiment, the fan assembly 41 of the gas turbine engine 40 (e.g., aircraft gas turbine engine) includes an array of fan blades 47 that extend radially outward from a rotor disk 48. The gas turbine engine 40 has an intake side (e.g., proximate the fan assembly 41) and an exhaust side (e.g., proximate the LPT 46). The fan assembly 41 and the LPT 46 are coupled by a low-speed rotor shaft 49, and the high pressure compressor 43 and the HPT 45 are coupled by a high-speed rotor shaft 51. The gas turbine engine 40 may be any type of gas or combustion turbine aircraft engine including, but not limited to, turbofan, turbojet, turboprop, turboshaft engines as well as geared turbine engines such as geared turbofans, un-ducted fans and open rotor configurations. Alternatively, the gas turbine engine 40 may be any time of gas or combustion turbine engine, including, but not limited to, land-based gas turbine engines in simply cycle, combined cycle, cogeneration, marine and industrial applications.

Generally, in operation, air flows axially through the fan assembly 41, in a direction that is substantially parallel to a centerline 53 that extends through the gas turbine engine 40, and compressed air is supplied to the high pressure compressor 43. The highly compressed air is delivered to the combustor 44. Combustion gas flow (not shown) from the combustor 44 drives the turbines 45 and 46. The HPT 45 drives the compressor 43 by way of the shaft 51, and the LPT 46 drives the fan assembly 41 by way of the shaft 49. Moreover, in operation, foreign material, such as mineral dust, is ingested by the gas turbine engine 40 along with the air, and the foreign material accumulates on surfaces therein.

Figure 3:
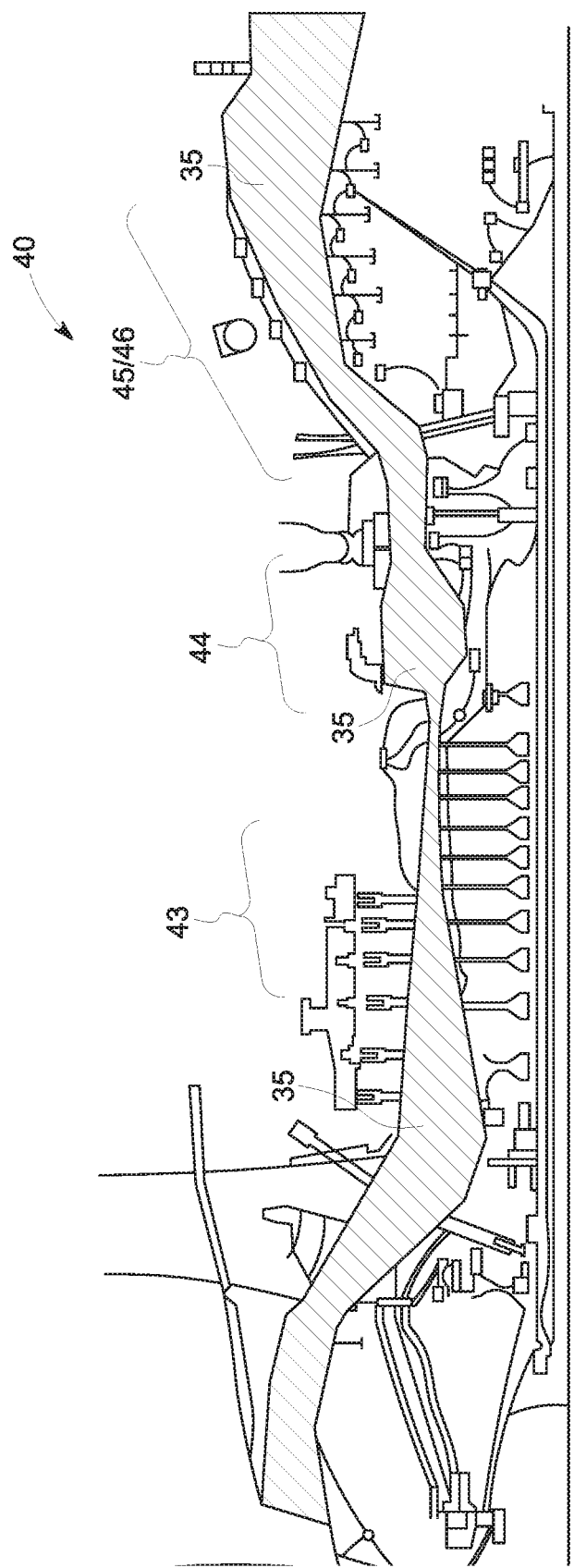
FIG. 3 is a cross-sectional schematic view of an embodiment of a cleaning volume or fluid passageway of the turbine system of FIG. 2, in accordance with an aspect of the present disclosure.

As shown, the cleaning system 11 supplies the cleaning agent (e.g., the detergent based foam) to a number of inlets to the gas turbine engine 40 (e.g., to the fluid passageway 35 thereof). An example of an embodiment of the fluid passageway 35 extending continuously through various components of the gas turbine engine 40 of FIG. 2 (e.g., through at least the compressor 43, the combustor 44, and the turbine stages 45, 46) is shown in FIG. 3. As shown in FIG. 3, the cleaning system 11 may inject or enable flow of the detergent based foam into the fluid passageway 35 along multiple locations of the gas turbine engine 40. The inlets to the fluid passageway 35 may include inlets used for other purposes, such as inlets for borescope inspections, ports for borescope inspections, ports for igniters, and inlets for fuel manifold nozzles. It should also be noted that the cleaning system 11 may be utilized for cleaning the fluid passageway 35 of any gas turbine engine 40 (e.g., including the turbine system 10 of FIG. 1) in accordance with presently described embodiments.

Figure 4:
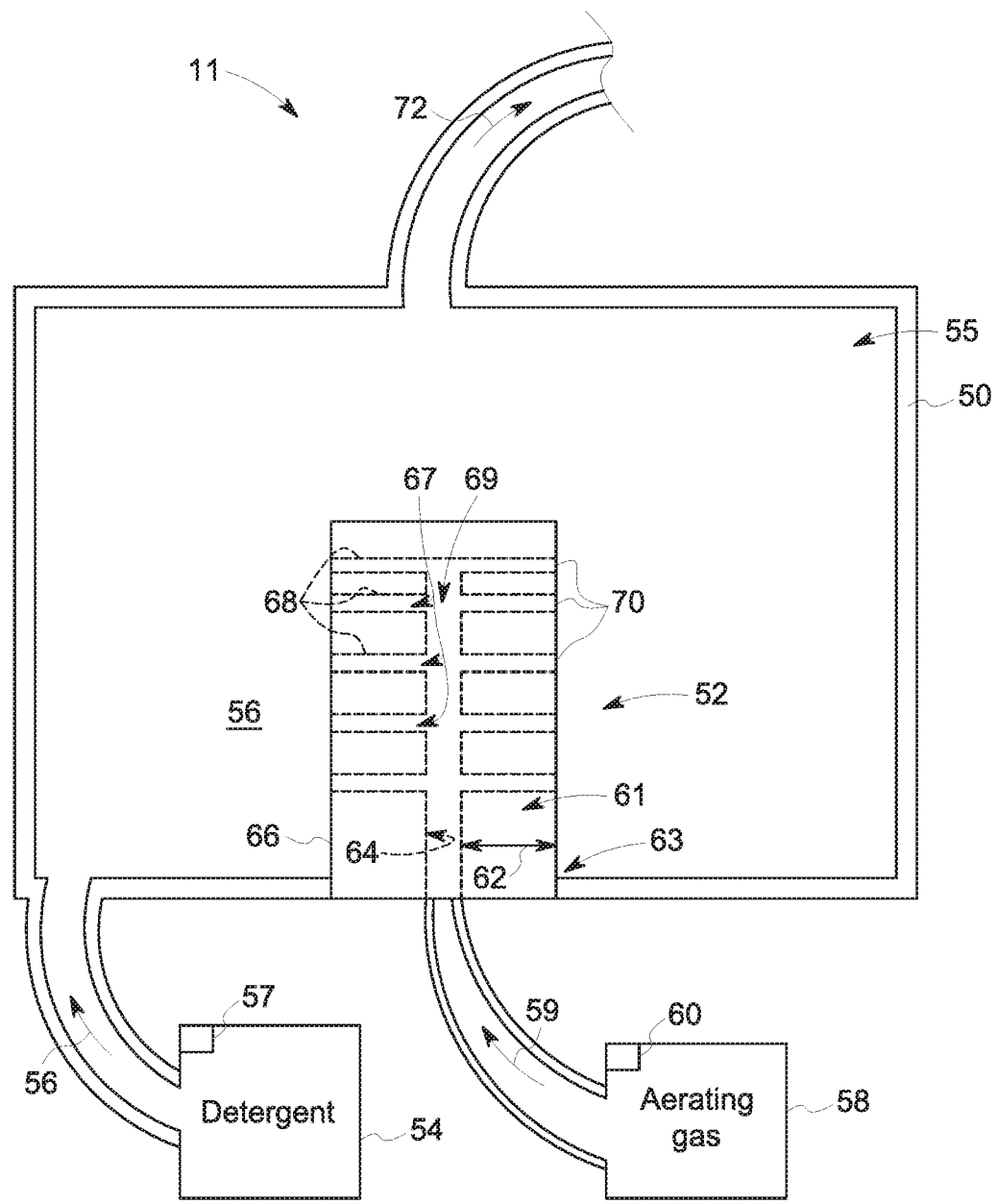
FIG. 4 is a cross-sectional schematic view of an embodiment of a foam generating system for cleaning the turbine system of FIG. 2, in accordance with an aspect of the present disclosure.

FIG. 4 is a schematic illustration of a portion of the cleaning system 11 of FIGS. 1 and 2, where the cleaning system 11 includes a foam chamber 50 having a foaming nozzle 52 disposed therein. Although only one foaming nozzle 52 is shown in the schematic illustration of FIG. 4, it should be appreciated that two or more foaming nozzles 52 in accordance with the present disclosure may be included in (e.g., interfaced with) the foam chamber 50.

In the illustrated embodiment, the foam chamber 50 includes an internal space 55 fluidly coupled with a detergent tank 54, which supplies a liquid detergent 56 to the internal space 55 (e.g., via a pump 57). In some embodiments, the internal space 55 of the foam chamber 50 may receive the liquid detergent 56 such that the foaming nozzle 52 is submerged or immersed (e.g., partially or fully) in the liquid detergent 56. The foaming nozzle 52 may be physically coupled with the foam chamber 50 (e.g., via a threaded connection 63) and with an aerating gas tank 58. As shown, any aerating gas 59 is supplied to the foaming nozzle 52 from the aerating gas tank 58 (e.g., via a blower 60 or pump) and the gas passes first through the foaming nozzle 52, and then to the internal space 55 of the foam chamber 50. The aerating gas 59 stored in the aerating gas tank 58 may be, for example, air or nitrogen (or any other suitable gas for aeration).

The foaming nozzle 52 in the illustrated embodiment includes a wall 61 having a thickness 62 defined between an inner surface 64 of the foaming nozzle 52 and an outer surface 66 of the foaming nozzle 52. Although the outer surface 66 of the foaming nozzle 52 in the illustrated embodiment is cylindrical, the foaming nozzle 52 (or outer surface 66 thereof) may form some other shape, such as a hexagonal prism or a rectangular prism. In other words, while a cross-section of the foaming nozzle 52 in the illustrated embodiment includes a circular outer perimeter, the cross-section may include some other shape in a different embodiment.

The inner surface 64 may define (e.g., extend circumferentially about) an inner plenum 69 of the foaming nozzle 52, where the inner plenum 69 is fluidly coupled with the aerating gas tank 58 to receive the aerating gas 59. The inner plenum 69 may act as a manifold for distributing the aerating gas 59 to the inner space 55 of the foam chamber 50 (which includes the liquid detergent 56 therein). For example, the inner plenum 69 may be fluidly coupled with inlets 67 to several jets 68 (e.g., radial jets, through holes, radial through holes) of the foaming nozzle 52, where the jets 68 supply the aerating gas 59 from the inner plenum 69 to the inner space 55 of the foam chamber 50. As previously described, the inner space 55 of the foam chamber 50 may include the liquid detergent 56 therein, such that the foaming nozzle 52 is submerged or immersed (e.g., partially or fully) in the liquid detergent 56. As the aerating gas 59 exits outlets 70 of the jets 68 of the foaming nozzle 52, the aerating gas 59 may aerate the liquid detergent 56, thereby generating bubbles 72. The bubbles 72 may be routed from the foam chamber 50 to, for example, one or more components of a turbine engine, as previously described.

In accordance with the present disclosure, the jets 68 of the foam nozzle 52 may include regular cross-sectional shapes (e.g., circles, ellipses, or ovals). The foam nozzle 52 of the present disclosure may be manufactured (e.g., 3-D printed) with precision to include the regular cross-sectional shapes, whereas traditional embodiments may be powder-pressed or otherwise manufactured in a way that causes jets 68 with irregularly shaped cross-sections. Further, the foam nozzle 52 may include a material compatible with temperatures up to 95° C. (approximately 203° F.), compatible with acidic and/or alkaline detergents, and compatible with organic solvents. In other words, the material of the foam nozzle 52 may be such that the temperature and fluids or chemicals described above do not substantially degrade a structure and/or performance of the foam nozzle 52. The material of the foam nozzle 52 may be, for example, certain plastics, certain thermoplastics, certain metals, certain ceramics, or certain composites thereof.

The regularly shaped cross-sections of the jets 68 of the presently disclosed foaming nozzle 52 enable generation of bubbles having a uniform/consistent size distribution. For example, bubbles having diameters between 0.1 millimeters and 1 millimeter may be desired. The foaming nozzle 52 of the present disclosure may enable generation of at least 40 percent (e.g., between 40 percent and approximately 100 percent) of the total volume of bubbles 72 having diameters of less than 1 millimeter (e.g., between 0.01 millimeter and 1 millimeter). The cross-sectional shapes of the jets 68 of the foaming nozzle 52, and other features of the foaming nozzle 52 in accordance with the present disclosure, are described in detail below.

It should be noted that FIG. 4 illustrates a cylindrical shape of a body of the foaming nozzle 52. The inner plenum 69 of the foaming nozzle 52 also includes a cylindrical shape. While FIGS. 5-37, described in detail below, include embodiments having a general cylindrical shape of the foaming nozzle 52 and corresponding inner plenum 69, it should be appreciated that embodiments in accordance with the present disclosure include other shapes of a body of the foaming nozzle 52 and the inner plenum 69, including other axisymmetric and other non-axisymmetric. Further, it should be appreciated that the patterns of the jets 68 described below with reference to the drawings may be implemented in foaming nozzles 52 in accordance with the present disclosure that do not include the cylindrical and/or axisymmetric shapes illustrated in certain of the drawings. Further still, it should be appreciated that references to a longitudinal axis of the foaming nozzle 52 may be applicable to embodiments that do not include a body having a cylindrical and/or axisymmetric shape. For example, in embodiments having non-cylindrical and/or non-axisymmetric shapes for the body of the foaming nozzle 52, the longitudinal axis may be taken as extending through (and from) the inlet section 92 (see FIG. 5, for example) of the foaming nozzle 52 upwardly through the non-cylindrical and/or non-axisymmetric shapes of the body 88 of the foaming nozzle 52. Additional description of example non-cylindrical and/or non-axisymmetric shapes will be described with reference to FIG. 40.

Figure 5:
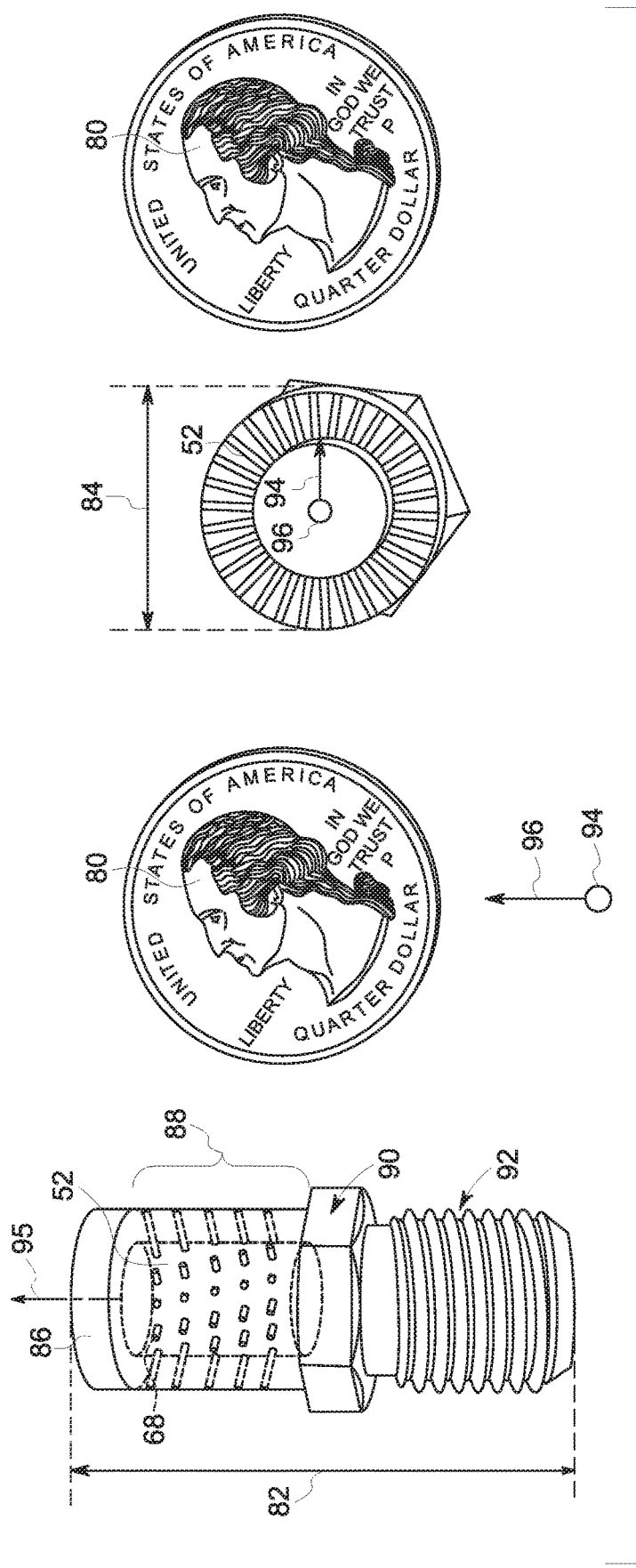
FIG. 5 is an illustration of a side view (left) and a top view (right) of an embodiment of a foaming nozzle for use in the foam generating system of FIG. 4, in accordance with an aspect of the present disclosure.

FIG. 5 is an illustration of a side view and a top view of an embodiment of the foaming nozzle 52 for use in the portion of the cleaning system 11 (e.g., the foam generating portion) of FIG. 4. The foaming nozzle 52 in the illustrated embodiment includes a length 82 of approximately 40 millimeters, and a diameter 84 of approximately 20 millimeters. The foaming nozzle 52 includes a head 86, a body 88, a base 90, and inlet section 92 (having threads) disposed below the base 90. The jets 68 of the foaming nozzle 52 in the illustrated embodiment (shown in the side view of FIG. 5) extend in a radial direction 94 with respect to a longitudinal axis 95 extending from the inlet section 92 of the foaming nozzle 52 through the inner plenum of the foaming nozzle 52 (e.g., where the longitudinal axis 95 extends along [coincides with] an axial direction 96). As previously described, the jets 68 include regularly shaped cross-sections (e.g., circles, ovals, ellipses). Different types of shapes and orientations/configurations of the jets 68 of the foaming nozzle 52 will be described in detail below with reference at least to FIGS. 6-37. It should be noted that the various jet orientations/configurations may be designed with at least four effects in mind. For example, the orientations/configurations of the jets 68 may be selected to (a) improve mixing of detergent and aerating gas; (b) improve radial dispersion of foam bubbles from the outer surface 66 of the foaming nozzle 52 (i.e., such that fresh liquid detergent can replace the bubbles for further bubble generation); (c) improve axial displacement of the foam bubbles from the outer surface 66 of the foaming nozzle 52 (i.e., such that fresh liquid detergent can replace the bubbles for further bubble generation); and (d) improve consistency of bubble diameter.

Figure 6:
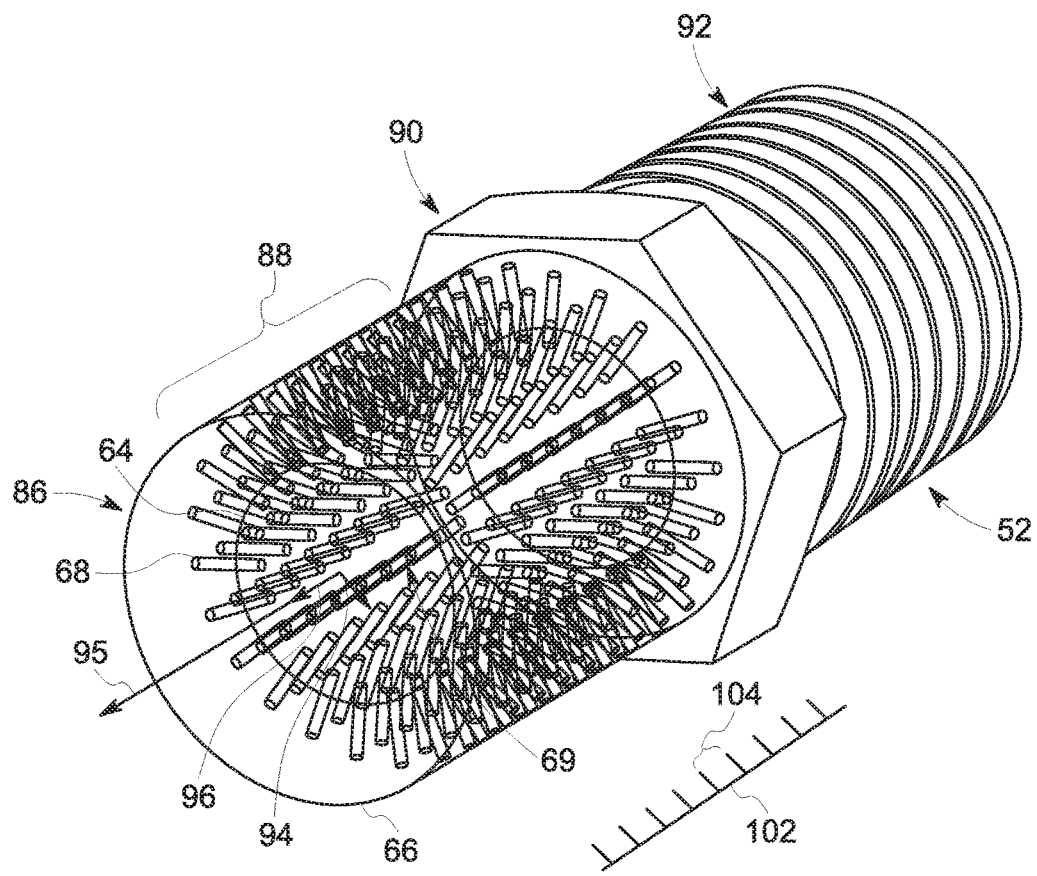
FIG. 6 is a perspective view of an embodiment of the foaming nozzle of FIG. 5 having radial jets, in accordance with an aspect of the present disclosure.
Figure 7:
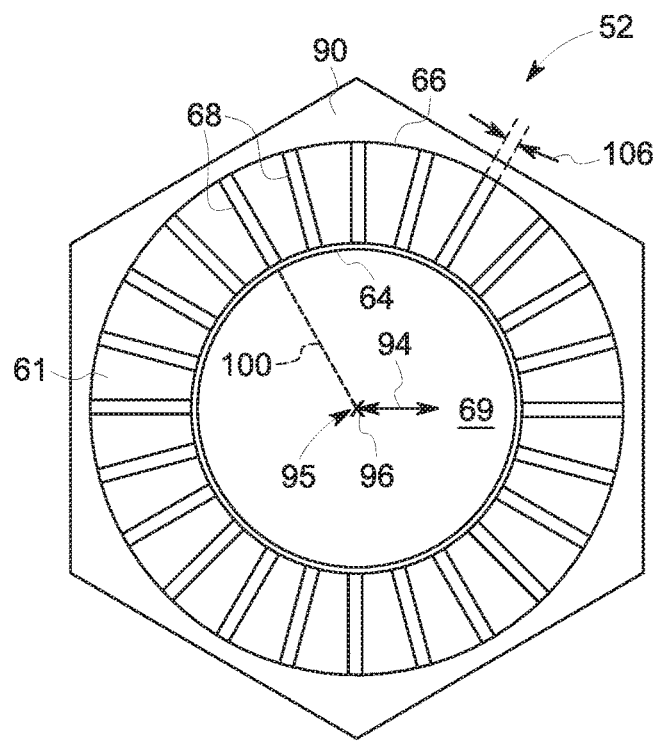
FIG. 7 is a top view of the foaming nozzle of FIG. 6, in accordance with an aspect of the present disclosure.

FIG. 6 is a perspective view of an embodiment of the foaming nozzle 52 of FIG. 5 having purely radial jets 68, and FIG. 7 is a top view of the foaming nozzle 52 of FIG. 6. In the embodiment illustrated in FIGS. 6 and 7, the purely radial jets 68 extend radially between the inner surface 64 of the foaming nozzle 52 (e.g., defining the inner plenum 69) and the outer surface 66 of the foaming nozzle 52. As illustrated by dashed line 100, a hypothetical extension 100 of the purely radial jets 68 would intersect the longitudinal axis 95. In other words, the jets 68 of FIGS. 5 and 6 are purely radial 94, and the jets 68 are not offset from the longitudinal axis 95 (e.g., as illustrated by the hypothetical extension 100 intersecting the longitudinal axis 95). As shown in FIG. 7, the purely radial jets 68 are separated from each other by 15 degrees with respect to the hypothetical intersections 100 at the longitudinal axis 95. Thus, each row includes twenty four purely radial jets 68. However, the spacing between adjacent jets 68 may differ in another embodiment, such that there are fewer than or more than twenty four purely radial jets 68.

As illustrated in FIG. 6, rows 102 of the jets 68 may be spaced (by space 104) from each other by uniform amounts along axial positions with respect to the longitudinal axis 95. For example, adjacent rows 102 may be spaced (by space 104) from each other by approximately 2 millimeters (+/−1 millimeter). In other embodiments, the spaces 104 between the rows 102 of jets 68 may not be uniform (e.g., to improve radial dispersion in certain conditions). As shown in FIG. 7, each jet 68 may be cylindrical (e.g., having circular cross-sections) and include a cross-sectional diameter 106 (or maximum cross-sectional length, in embodiments with non-circular [e.g., oval or elliptical] jets 68) of between 0.01 millimeters (10 microns) and 1 millimeter. Other example jet orientations are described below.

Figure 8:
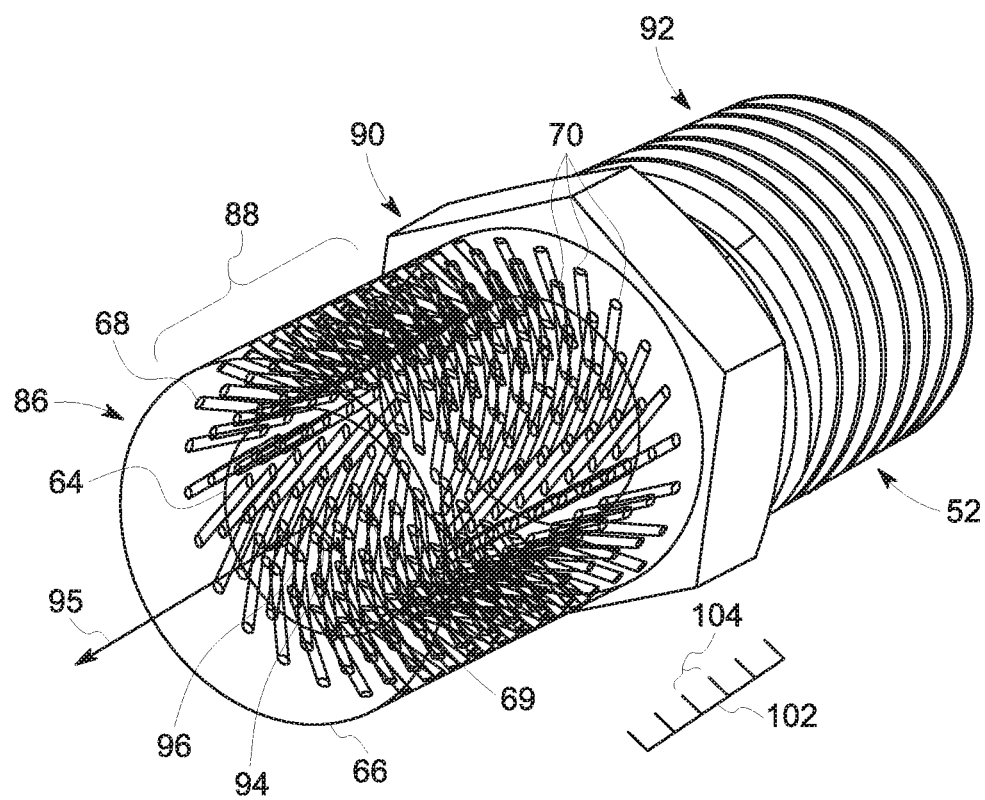
FIG. 8 is a perspective view of an embodiment of the foaming nozzle of FIG. 5 having radial swirl jets, in accordance with an aspect of the present disclosure.
Figure 9:
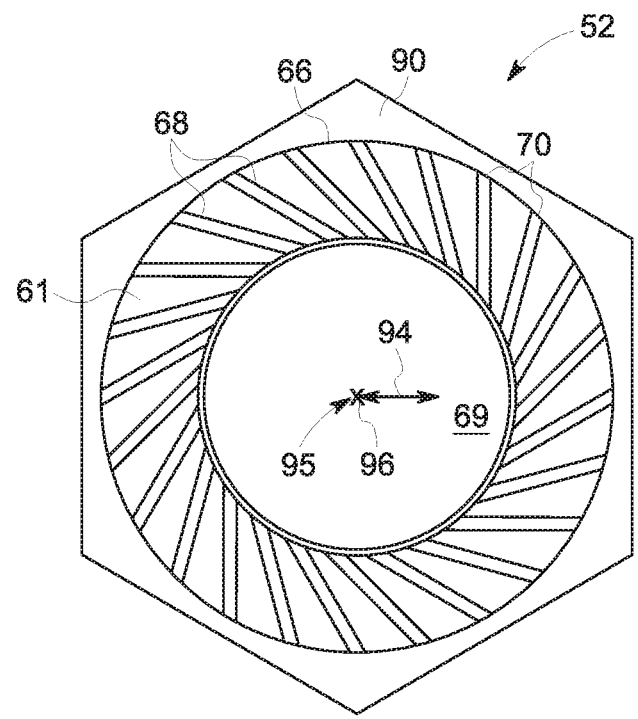
FIG. 9 is a top view of the foaming nozzle of FIG. 8, in accordance with an aspect of the present disclosure.

FIG. 8 is a perspective view of an embodiment of the foaming nozzle 52 of FIG. 5 having radial swirl jets 68, and FIG. 9 is a top view of the foaming nozzle 52 of FIG. 8. In the illustrated embodiments, the jets 68 of a particular row 102 are disposed in a radial plane with respect to the longitudinal axis 95. In other words, the jets 68 do not include an axial component. However, the jets 68 in FIGS. 8 and 9 are offset from the longitudinal axis 95 by an angle. In other words, hypothetical extensions of the jets 68 through the inner plenum 69 of the foaming nozzle 52 would not intersect the longitudinal axis 95. In the illustrated embodiment, the jets 68 are offset from the longitudinal axis 95 by, for example, a 60 degree angle. However, the jets 68 in another embodiment may be offset from the longitudinal axis 95 by a larger angle (increasing the angle at which the jets 68 "swirl" and, thus, increasing a length of each jet 68 through the wall 61), or by a smaller angle (decreasing the angle at which the jets 68 "swirl" and, thus, decreasing a length of each jet 68 through the wall 61). In the illustrated embodiment, all the jets 68 are oriented in the counterclockwise direction looking down from the head 86 of the foaming nozzle 52, although other configurations are possible and described in detail below. The types of jets 68 illustrated in FIGS. 8 and 9 may be referred to as "radial swirl" jets 68 or "regular radial swirl" jets 68. Jets 68 which swirl in the opposing direction may be referred to as "reverse radial swirl" jets 68, as will be appreciated with reference to later figures. It should be noted that the outlets 70 of the jets 68 may be aligned in the aforementioned radial plane for each row 102. Further, the outlets 70 of the jets 68 across multiple rows 102 may be circumferentially aligned in axially arranged columns, which may align the circumferential swirl effect of the aerating gas proximate to the outer surface 66 of the foaming nozzle 52.

The regular swirl configuration illustrated in FIGS. 8 and 9 may cause the aerating gas exiting the jets 68 to circumferentially swirl at the outer surface 66 of the foaming nozzle 52, which may improve mixing of the aerating gas and detergent, which may lead to more efficient bubble generation. Further, the illustrated configuration in FIGS. 8 and 9 may provide a scrubbing action on the surface of the foaming nozzle 52 so that new liquid detergent can be presented to the jets 68. In other words, the regular swirl configuration may efficiently generate the bubbles, then cause the bubbles to be moved such that fresh liquid detergent can be aerated.

Figure 10:
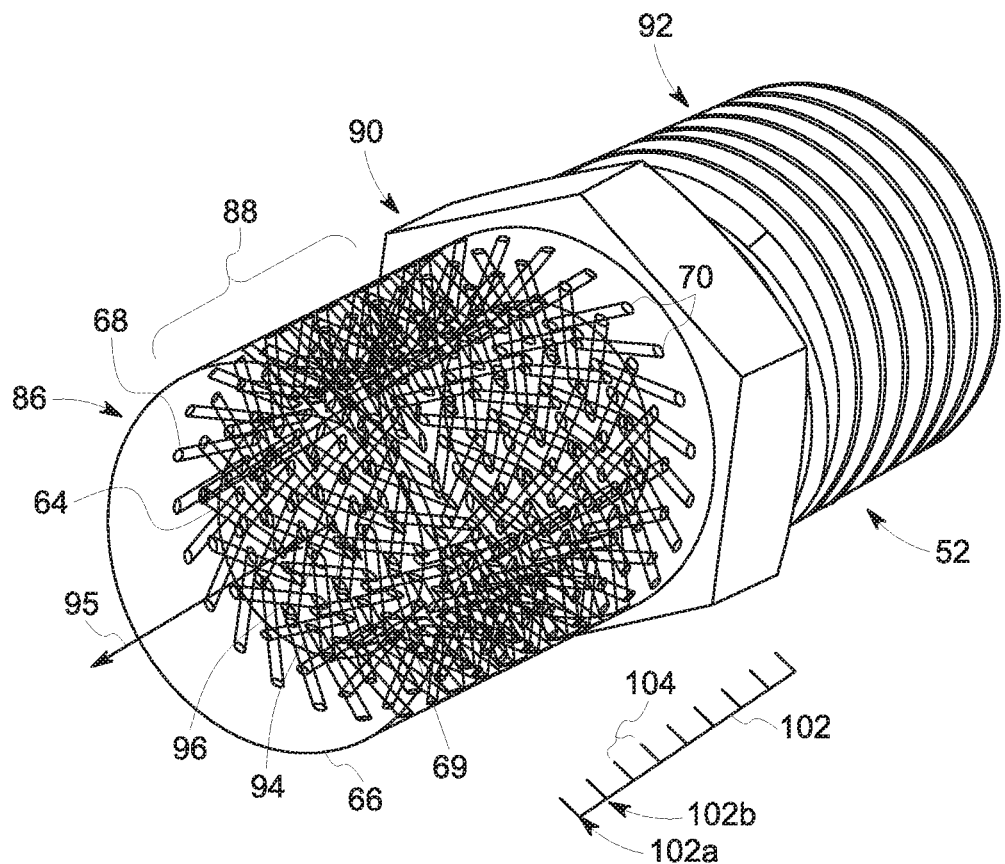
FIG. 10 is a perspective view of an embodiment of the foaming nozzle of FIG. 5 having radial swirl jets alternating between clockwise and counterclockwise directions with respect to adjacent rows of jets, in accordance with an aspect of the present disclosure.
Figure 11:
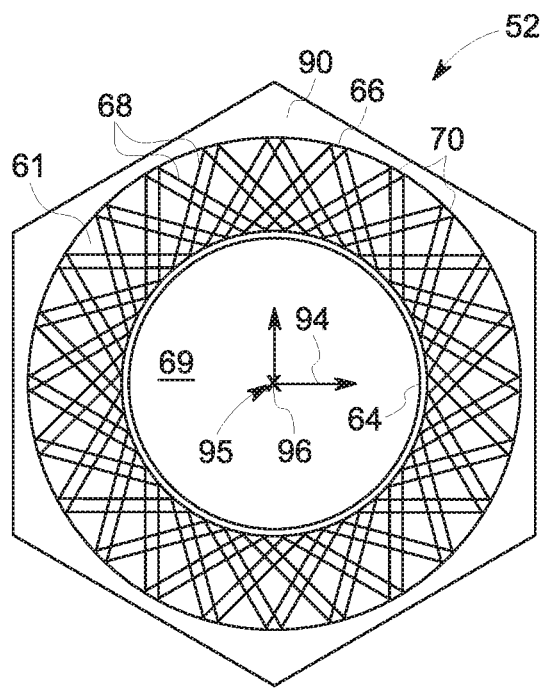
FIG. 11 is a top view of the foaming nozzle of FIG. 10, in accordance with an aspect of the present disclosure.

FIG. 10 is a perspective view of an embodiment of the foaming nozzle 52 of FIG. 5 having radial swirl jets 68 oriented in opposing directions at each successive row of jets 68, and FIG. 11 is a top view of the foaming nozzle 52 of FIG. 10. In other words, the foaming nozzle 52 includes a row of regular radial swirl jets 68, and a row of reverse radial swirl jets 68. Like the embodiment illustrated in FIGS. 8 and 9, the jets 68 of a particular row 102 of jets 68 in FIGS. 10 and 11 extend within a single radial plane (i.e., without having an axial component), and are offset from the longitudinal axis 95. However, in FIGS. 10 and 11, a first row 102a includes radial swirl jets 68 oriented counterclockwise (i.e., +60 degree offset from the longitudinal axis 95) looking down from the head 86 of the foaming nozzle 52, and a second row 102b adjacent the first row 102a includes reverse radial swirl jets 68 oriented clockwise (i.e., −60 degree offset from the longitudinal axis 95) looking down from the head 86 of the foaming nozzle 52. Because the first row 102a of jets 68 is offset/oriented in one direction and the second row 102b of jets 68 is offset/oriented in the opposing direction by the same amount, the angular difference between the jets 68 of the first and second rows 102a, 102b is, for example, 120 degrees (although the combined angular difference may be different if the jets 68 are offset by a different amount from the longitudinal axis 95 than 60 degrees). This configuration may be referred to as an alternating radial swirl jet configuration. As shown, the outlets 70 may be circumferentially aligned in axially arranged columns. Further, adjacent rows 102 (i.e., the first row 102a and the second row 102b) may be referred to as an ensemble or a "unit." Each unit may be repeated along axial positions of the body 88 of the foaming nozzle 52 (i.e., with respect to the longitudinal axis 95). The two-row unit having counterclockwise (in the first row 102a) and clockwise (in the second row 102b) jets 68 may improve mixing of the aerating gas and liquid detergent, and may improve radial dispersion of the foam bubbles from the outer surface 66 of the foaming nozzle 52.

Figure 12:
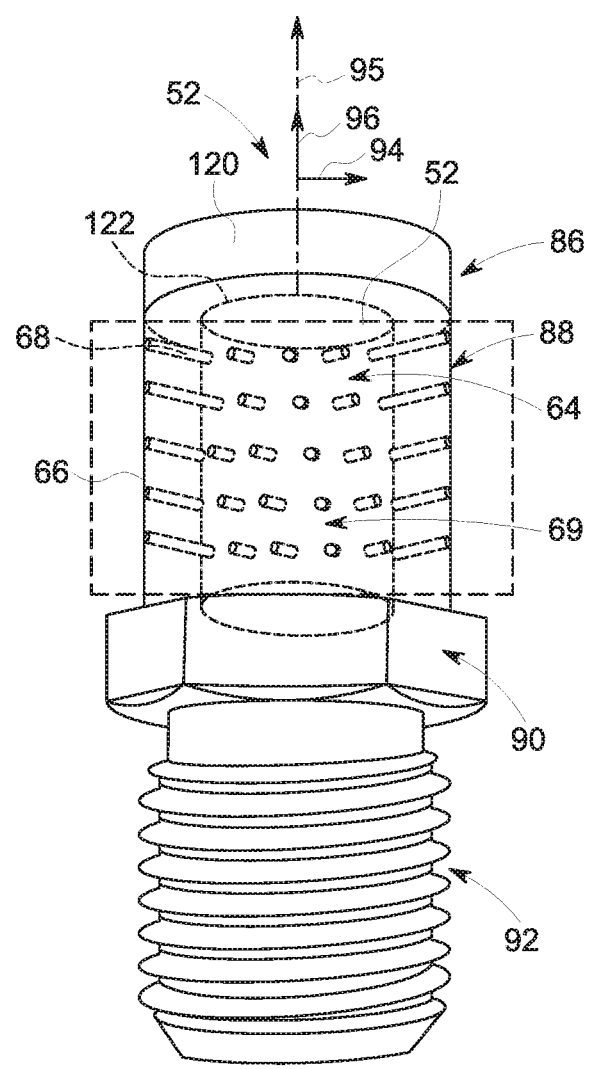
FIG. 12 is a side view of an embodiment of the foaming nozzle of FIG. 5 with an illustrative box identifying a body of the foaming nozzle, in accordance with an aspect of the present disclosure.

FIGS. 12-19 are illustrated, as described below, to succinctly describe other orientations/configurations of jets 68 for use in particular portions of the foaming nozzle 52 of FIG. 5. For example, FIG. 12 illustrates the foaming nozzle 52 and includes an identifying box outlining the body 88 of the foaming nozzle 52, and FIGS. 13-19 illustrate symbols indicative of orientations/configurations of individual jets 68 (e.g., within rows) that may be included in the body 88 of the foaming nozzle 52 illustrated in FIG. 12. In other words, each of FIGS. 13-19 represents a "unit" or "unit pattern" which may be repeated multiple times in the body 88 of the foaming nozzle 52 (e.g., axially repeated) outlined in FIG. 12. A "+" symbol used in drawings described below indicates a purely radial jet 68. A right-pointing arrow ("4") used in drawings described below indicates a radial swirl jet 68 oriented in the counterclockwise direction (looking downwardly from the head 86 of the foaming nozzle 52), and a left-pointing arrow ("F") used in drawings described below indicates a reverse radial swirl jet 68 oriented in the clockwise direction (e.g., looking downwardly from the head 86 of the foaming nozzle 52 illustrated in FIG. 12). An arrow pointing diagonally (e.g., to the right and upwardly, to the left and upwardly, to the right and downwardly, or to the left and downwardly) indicates a jet 68 having both radial (e.g., radial swirl) and axial components. In other words, jets 68 having both radial (e.g., radial swirl) and axial components are not contained within a single radial plane, which differs from the jets 68 shown in, and described with respect to, FIGS. 6-11. It should be noted that the rows of jets 68 illustrated in FIGS. 13-19 (and throughout this description utilizing the short-hand symbols described above) are illustrated in spatial order. That is, the higher the row, the closer the row is to the head 86 of the foaming nozzle 52. Reference numerals from FIG. 12 may be referred to with respect to the descriptions of FIGS. 13-19 below. It should also be appreciated that the inner plenum 69 illustrated in FIG. 12 extends downwardly through the inlet section 92, as previously described with respect to FIG. 4, and that in certain embodiments jets 68 may extend from the inner plenum 69 through the illustrated base 90 of the nozzle 52.

Figure 13:
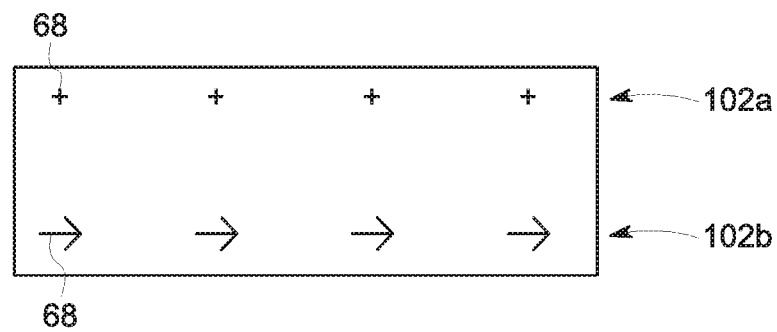
FIG. 13 is a side view of an embodiment of a two-row jet pattern for use in the body of the foaming nozzle of FIG. 12, in accordance with an aspect of the present disclosure.

FIG. 13 illustrates a two-row unit pattern having a first row 102a of jets 68 and a second row 102b of jets 68. The first row 102a in FIG. 13 includes purely radial jets 68, and the second row 102b in FIG. 13 includes radial swirl jets 68 offset from the longitudinal axis 95 (illustrated in FIG. 12) and oriented in the counterclockwise direction. In another embodiment, the second row 102b may include reverse radial swirl jets 68 offset from the longitudinal axis 95 (illustrated in FIG. 12) and oriented in the clockwise direction. The first row 102a of purely radial jets 68 may improve radial dispersion of the foam bubbles from the external surface of the foaming nozzle, and the second row 102b of radial swirl jets 68 may improve mixing of the aerating gas and the detergent.

Figure 14:
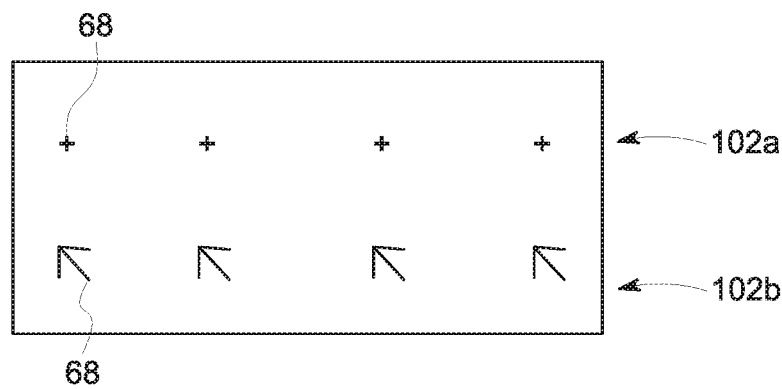
FIG. 14 is a side view of an embodiment of a two-row jet pattern for use in the body of the foaming nozzle of FIG. 12, in accordance with an aspect of the present disclosure.

FIG. 14 illustrates another two-row unit pattern having a first row 102a and a second row 102b. The first row 102a in FIG. 14 includes purely radial jets 68, and the second row 102b in FIG. 14 includes reverse radial swirl+axially upward jets 68, with the axial component directed upwardly (i.e., toward the head of the foaming nozzle), and the reverse radial component directed toward the left (i.e., indicating a reverse radial swirl component). By include jets 68 with an axial component, axial displacement of bubbles is approved, which enables fresh detergent to replace the displaced foam bubbles adjacent to the surface of the foam nozzle 52. The axial component also improves mixing of the aerating gas and the detergent. The radial (e.g., reverse radial) component may improve bubble dispersion. Further, the first row 102a of purely radial jets 68 may also improve radial dispersion of the bubbles from the external surface of the foaming nozzle.

Figure 15:
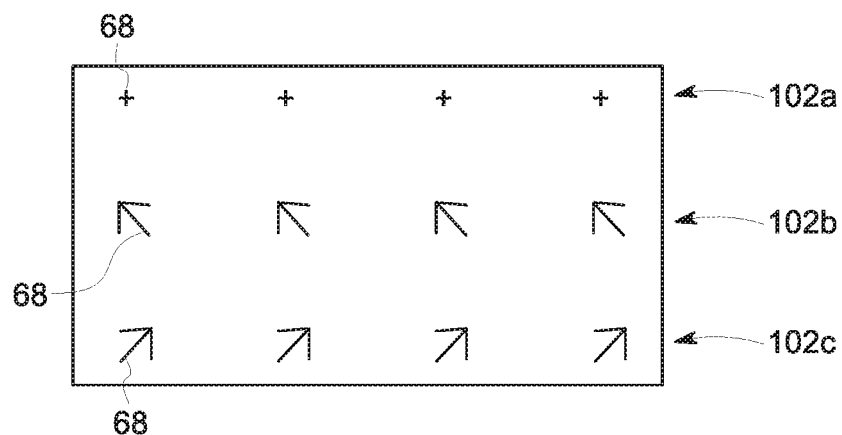
FIG. 15 is a side view of an embodiment of a three-row jet pattern for use in the body of the foaming nozzle of FIG. 12, in accordance with an aspect of the present disclosure.

FIG. 15 illustrates a three-row unit pattern having a first row 102a of jets 68, a second row 102b of jets 68, and a third row 102c of jets 68. The first row 102a of jets 68 includes purely radial jets 68, the second row 102b of jets 68 includes reverse radial swirl+axially upward jets 68 (i.e., upwardly and toward the left), and the third row 102c of jets 68 includes reverse radial swirl+axially upward jets 68 (i.e., upwardly and toward the right). The first row 102a may improve radial dispersion of the foam bubbles from the external surface of the foaming nozzle 52, while the second and third rows 102b and 102c improve mixing of the aerating gas and detergent and displacement of the foam bubbles, dispersion, and axial displacement of the bubbles.

Figure 16:
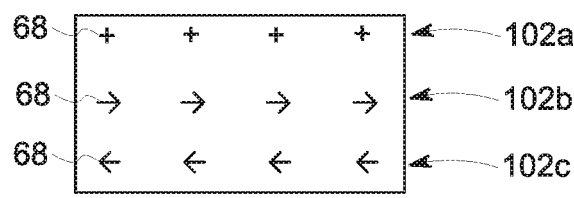
FIG. 16 is a side view of an embodiment of a three-row jet pattern for use in the body of the foaming nozzle of FIG. 12, in accordance with an aspect of the present disclosure.

FIG. 16 illustrates another three-row unit pattern having a first row 102a of jets 68, a second row 102b of jets 68, and a third row 102c of jets 68. The first row 102a includes purely radial jets 68, the second row 102b includes radial swirl jets 68, and the third row 102 includes reverse radial swirl jets 68 (e.g., such that the second row 102b and the third row 102c can be described as alternating radial swirls). The alternating aspect of the second and third rows 102b, 102c may reduce the size and number of recirculation zones between adjacent layers of jets 68 and may improve interaction between the aerating gas (i.e., air) and the detergent, providing more efficient bubble generation. As previously described, the purely radial jets 68 of the first row 102a may improve dispersion of the foam bubbles.

Figure 17:
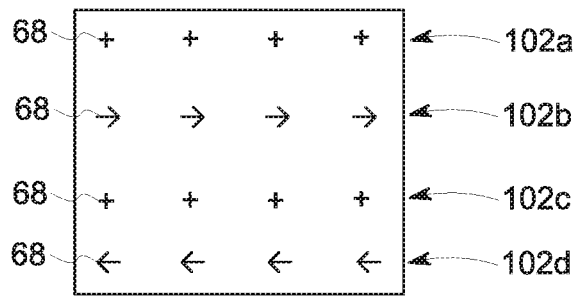
FIG. 17 is a side view of an embodiment of a four-row jet pattern for use in the body of the foaming nozzle of FIG. 12, in accordance with an aspect of the present disclosure.
Figure 18:
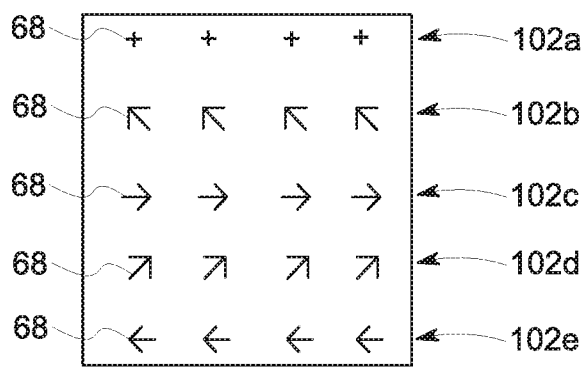
FIG. 18 is a side view of an embodiment of a five-row jet pattern for use in the body of the foaming nozzle of FIG. 12, in accordance with an aspect of the present disclosure.
Figure 19:
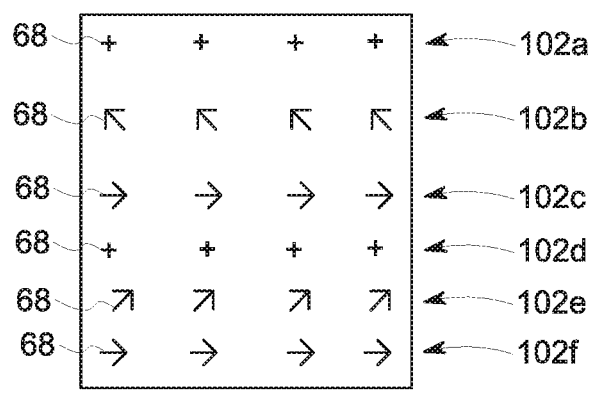
FIG. 19 is a side view of an embodiment of a six-row jet pattern for use in the body of the foaming nozzle of FIG. 12, in accordance with an aspect of the present disclosure.

FIG. 17 is a side view of an embodiment of a four-row unit pattern for use in the body 88 of the foaming nozzle 52 of FIG. 12, FIG. 18 is a side view of an embodiment of a five-row unit pattern for use in the body 88 of the foaming nozzle 52 of FIG. 12, and FIG. 19 is a side view of an embodiment of a six-unit jet pattern for use in the body 88 of the foaming nozzle 52 of FIG. 12. In FIGS. 18 and 19, the configurations may improve axial pumping and flow of bubbles away from the foaming nozzle 52. For example, rows 102f and 102e of FIG. 19 may push bubbles toward row 102d, where row 102d pushes the bubbles away from the foaming nozzle 52. Similarly, rows 102e, 102d, 102c, and 102b of FIG. 18 may operate to push the bubbles upwardly and away from the foaming nozzle 52, and toward the upper row 102a, which operates to push the bubbles radially away from the foaming nozzle 52 (e.g., to make room for fresh liquid detergent). Further, the configurations may substantially improve efficient mixing of the air and the detergent and reduces dead zones on the outer surface 66 of the foaming nozzle 52.

Figure 20:
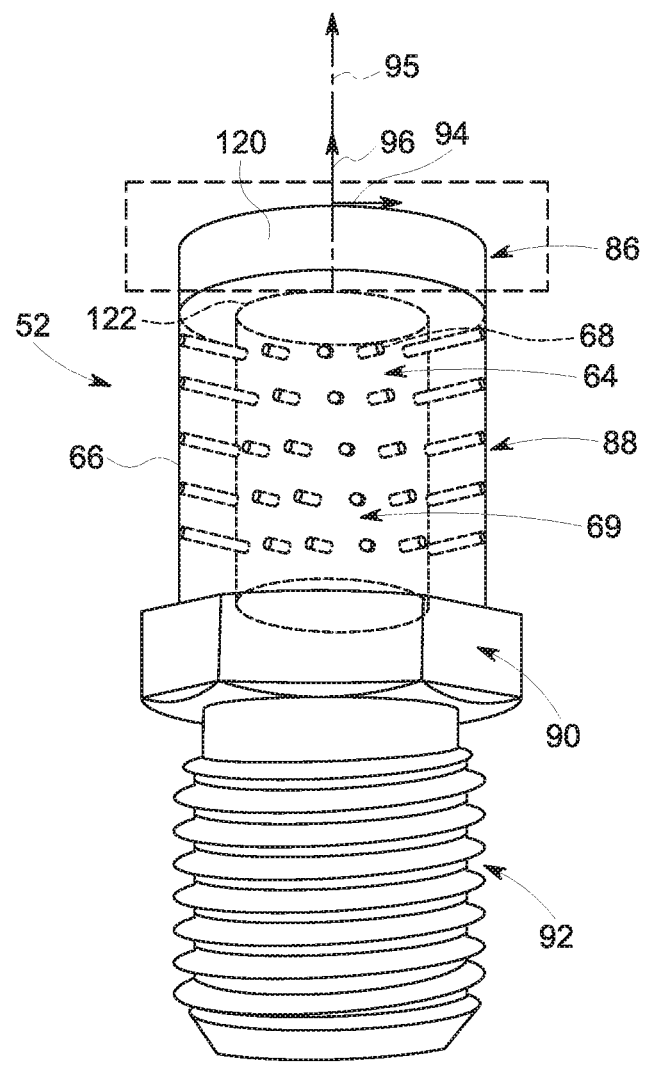
FIG. 20 is a side view of an embodiment of the foaming nozzle of FIG. 5 with an illustrative box identifying a top or head of the foaming nozzle, in accordance with an aspect of the present disclosure.

FIG. 20 is a side view of an embodiment of the foaming nozzle 52 of FIG. 5, with an illustrative box identifying the top or head 86 of the foaming nozzle 52. FIGS. 21-28 illustrate jet orientations/configurations that may be included within the head 86 of the foaming nozzle 52 in FIG. 20. As will be appreciated in view of the discussion with respect to FIGS. 21-28 below, the head 86 may include axially oriented jets extending through a top region 120 of the outer surface 66 of the foaming nozzle 52 (i.e. at the head 86). In other words, the axially oriented jets may extend between an upper portion 122 of the inner surface 64 defining the inner plenum 69 and the top region 120 of outer surface 66 of the foaming nozzle 52. Reference numerals illustrated in FIG. 20 may be referred to in the descriptions of FIGS. 21-28 below. It should be appreciated that the inner plenum 69 illustrated in FIG. 20 extends downwardly through the inlet section 92, as previously described with respect to FIG. 4, and that in certain embodiments jets 68 may extend from the inner plenum 69 through the illustrated base 90 of the nozzle 68.

Figure 21:
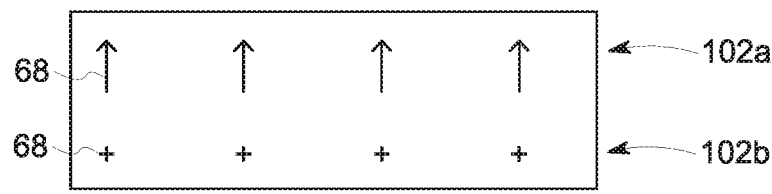
FIG. 21 is a side view of an embodiment of a jet geometry for use in the top or head of the foaming nozzle of FIG. 20, in accordance with an aspect of the present disclosure.

FIG. 21 is a side view of an embodiment of a jet geometry for use in the head 86 of the foaming nozzle 52 of FIG. 20. As shown, a first row 102a of the jet pattern includes jets 68 extending purely axially (i.e., substantially parallel with the longitudinal axis 95 of the foaming nozzle 52 illustrated in FIG. 20). As described above, the first row 102a of purely axial jets 68 may extend between (with reference to numerals illustrated in FIG. 20) the upper portion 122 of the inner surface 64 defining the inner plenum 69 and the top region 120 of the outer surface 66 of the foaming nozzle 52 (i.e., at the head 86 of the foaming nozzle 52). The second row 102b of the jet pattern may include purely radial jets 68. The axial jets 68 of the first row 102a may improve axial flow of bubbles away from (with reference to numerals illustrated in FIG. 20) the top region 120 of the head 86 of the foaming nozzle 52, and the radial jets 68 of the second row 102b may improve the radial flow of the bubbles away from the side of the foaming nozzle 52.

Figure 22:
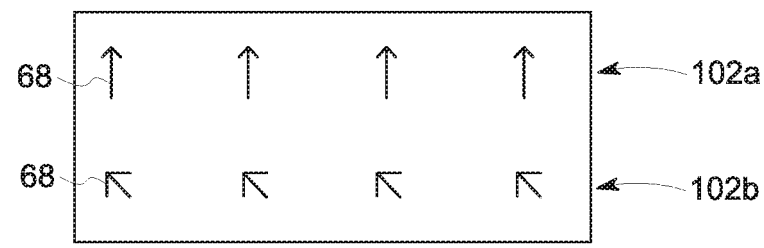
FIG. 22 is a side view of an embodiment of a jet geometry for use in the top or head of the foaming nozzle of FIG. 20, in accordance with an aspect of the present disclosure.

FIG. 22 includes the first row 102a having purely axial jets 68 and the second row 102b having reverse radial swirl+axially upward jets 68. As suggested in descriptions above, the axial components of the second row 102b of jets 68 may improve axial displacement of bubbles away from the sides of the outer surface 66 of the foaming nozzle 52, and the radial components of the second row 102b of jets 68 may improve radial dispersion of bubbles away from the sides of the outer surface 66 of the nozzle 52.

Figure 23:
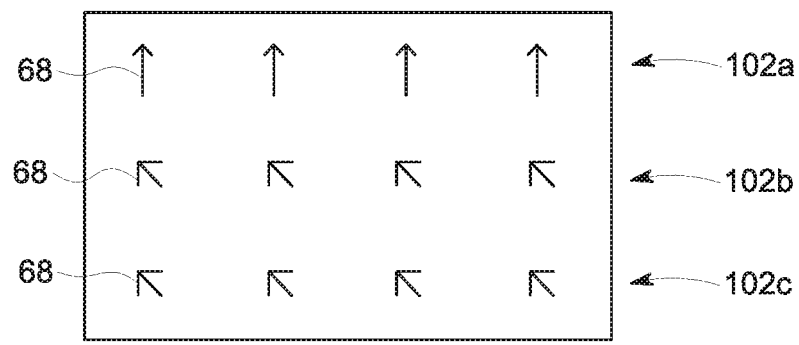
FIG. 23 is a side view of an embodiment of a jet geometry for use in the top or head of the foaming nozzle of FIG. 20, in accordance with an aspect of the present disclosure.

FIG. 23 includes the first row 102a having purely axial jets 68, the second row 102b having reverse radial swirl+axially upward jets 68, and the third row 102c having reverse radial swirl+axially upward jets 68. The purely axial jets 68 of the first row 102a may improve axial flow of bubbles upwardly. The second and third rows 102b, 102c may improve radial dispersion and axial displacement of bubbles, and may improve mixing of the aerating gas with the detergent. The second and third rows 102b, 102c may also direct the bubbles in to the streams emanating from the jets 68 of the first row 102a, thereby pushing the bubbles upwardly (e.g., in some embodiments toward a foam distribution network for distributing the foam to the turbine engine).

Figure 24:
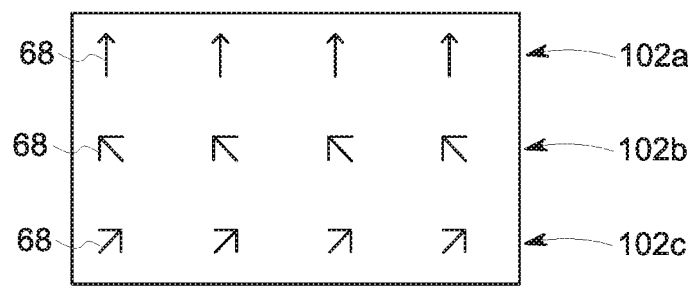
FIG. 24 is a side view of an embodiment of a jet geometry for use in the top or head of the foaming nozzle of FIG. 20, in accordance with an aspect of the present disclosure.

FIG. 24 includes the first row 102a having purely axial jets 68, the second row 102b having reverse radial swirl+axially upward jets 68, and the third row 102c having radial swirl+axially upward jets 68. The second and third rows 102b, 102c may operate to push bubbles toward the streams emanating from the purely axial jets 68 of the first row 102a, while additionally improving mixing of the aerating gas and the detergent (e.g., via the cross-directional radial components).

Figure 25:
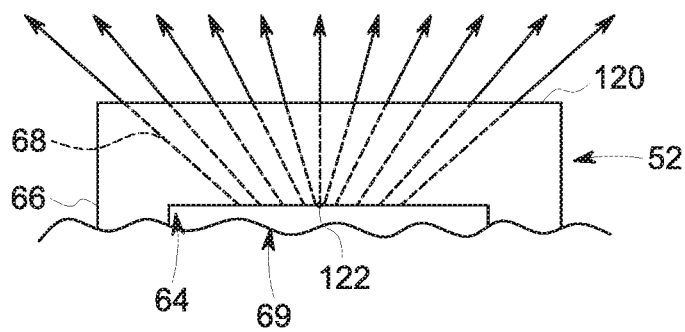
FIG. 25 is a front view of an embodiment of a jet geometry for use in the top or head of the foaming nozzle of FIG. 20, in accordance with an aspect of the present disclosure.

FIG. 25 illustrates a side view of the foaming nozzle 52 and includes axial jets 68 extending through the head 86 of the foaming nozzle 52 and out of the top region 120 of the outer surface 66 of the foaming nozzle 52. In the illustrated embodiment, the axially oriented jets 68 include a radial component. However, the jets extend from the lateral top portion 122 of the inner surface 64 defining the inner plenum 69, instead of from a side portion of the inner surface 64. In some embodiments, the jets 68 may intersect the top region 120 via a single ring of jets 68. However, as described below, multiple rings (e.g., columns, conical columns, etc.) may be included.

Figure 26:
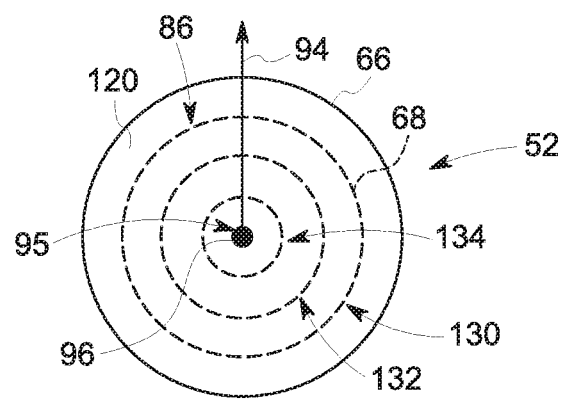
FIG. 26 is a top view of an embodiment of a jet geometry for use in the top or head of the foaming nozzle of FIG. 20, in accordance with an aspect of the present disclosure.

For example, FIG. 26 is a top view of an embodiment of the foaming nozzle 52. In other words, the top view shows the top region 120 (e.g., of the outer surface 66) at the head 86 of the foaming nozzle 52. The jets 68 extending through the top region 120 are arranged in a first ring 130, a second ring 132, and a third ring 134 intersecting the top region 120. However, other embodiments may include less than, or more than, the three rings 130, 132, 134 in FIG. 26. As previously described, the jets 68 of the three rings 130, 132, 134 may include radial components (e.g., such that the illustrated jets 68 extend downwardly and radially toward the longitudinal axis 95). However, in some embodiments, the jets 68 may be arranged in rings that extend only axially (i.e., along the axial direction 96 parallel with the longitudinal axis 95). Further, in the illustrated embodiment, the three rings 130, 132, 134 are evenly spaced from one another (e.g., at 25%, 50%, and 75% a total radius of the foaming nozzle 52). However, in other embodiments, the rings 130, 132, 134 may not be evenly spaced.

Figure 27:
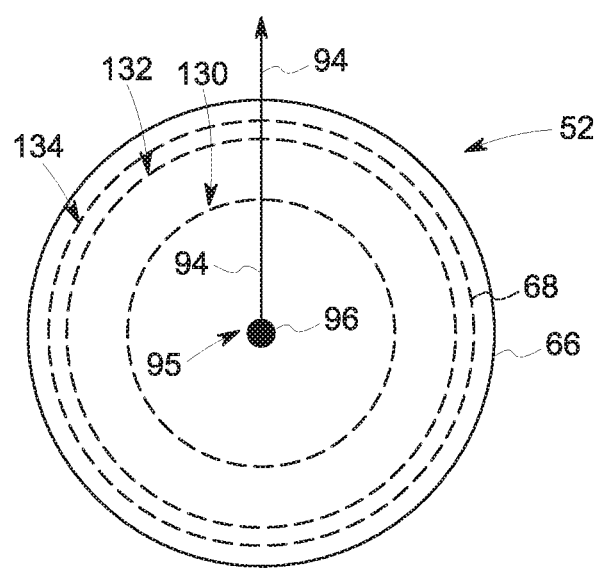
FIG. 27 is a top view of an embodiment of a jet geometry for use in the top or head of the foaming nozzle of FIG. 20, in accordance with an aspect of the present disclosure.

For example, FIG. 27 includes a top view of the foaming nozzle 52, where the three rings 130, 132, 134 of jets 68 are not evenly spaced from each other. The spacing is biased toward the outer surface 66 of the foaming nozzle 52. In other words, the distance between the first ring 130 (inner ring) and the second ring 132 (middle ring) is greater than the distance between the second ring 132 (middle ring) and the third ring 134 (outer ring). Of course, the jets 68 of all three rings 130, 132, 134 fluidly couple with the inner plenum of the foaming nozzle 52.

Figure 28:
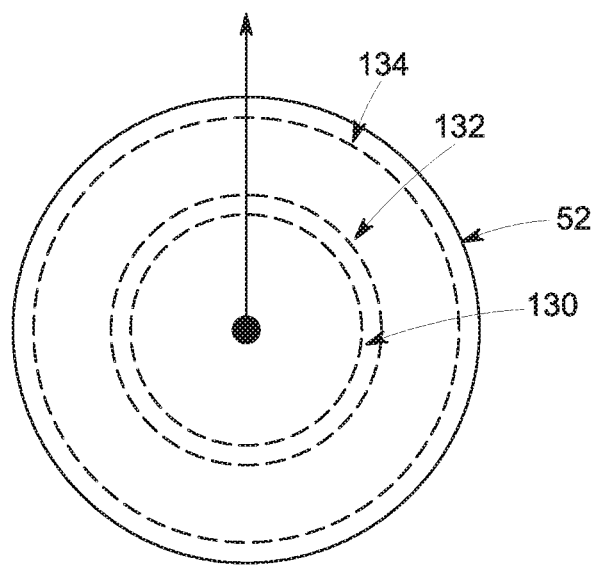
FIG. 28 is a top view of an embodiment of a jet geometry for use in the top or head of the foaming nozzle of FIG. 20, in accordance with an aspect of the present disclosure.

FIG. 28 includes a top view of the foaming nozzle 52, where the three rings 130, 132, 134 of jets 68 are not evenly spaced from each other. The spacing is biased toward an inner surface (not shown) of the foaming nozzle 52, instead of the outer surface 66. In other words, the distance between the first ring 130 and the second ring 132 is less than the distance between the second ring 132 and the third ring 134. Of course, the jets 68 of all three rings 130, 132, 134 fluidly couple with the inner plenum of the foaming nozzle 52.

Figure 29:
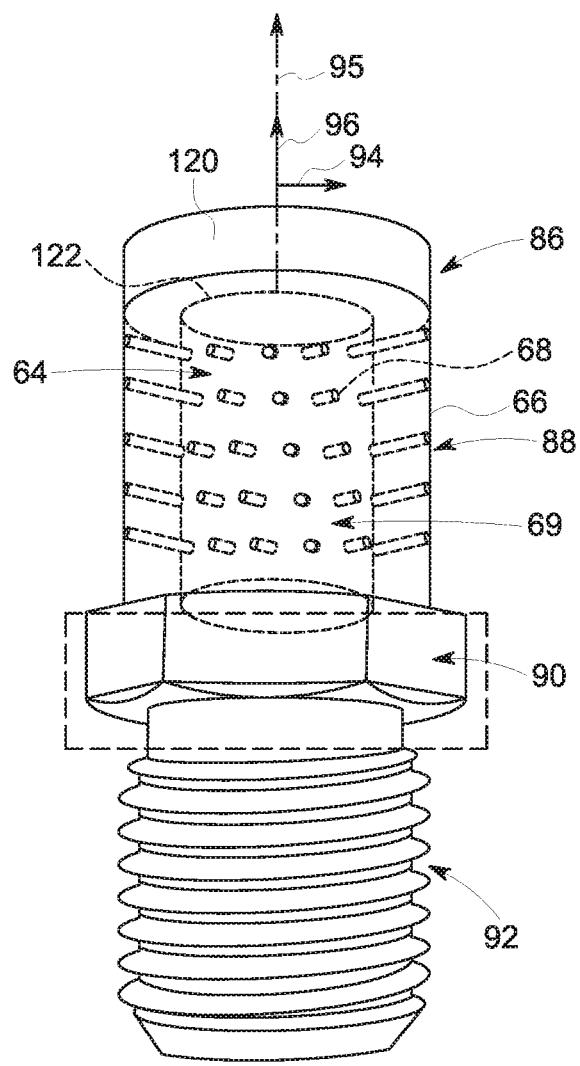
FIG. 29 a side view of an embodiment of the foaming nozzle of FIG. 5 with an illustrative box identifying a base of the foaming nozzle, in accordance with an aspect of the present disclosure.

FIG. 29 is a side view of an embodiment of the foaming nozzle 52 of FIG. 5 with an illustrative box identifying the base 90 of the foaming nozzle 52. FIGS. 30-37 illustrate jet orientations/configurations that may be utilized within the base 90 of the foaming nozzle 52. It should be noted that reference numerals from FIG. 29 may be utilized in the descriptions of FIGS. 30-37 below. It should be appreciated that the inner plenum 69 illustrated in FIG. 29 extends downwardly through the inlet section 92, as previously described with respect to FIG. 4, and that in the embodiments described with respect to FIGS. 30-37, jets 68 may extend from the inner plenum 69 through the illustrated base 90 of the nozzle 68.

Figure 30:
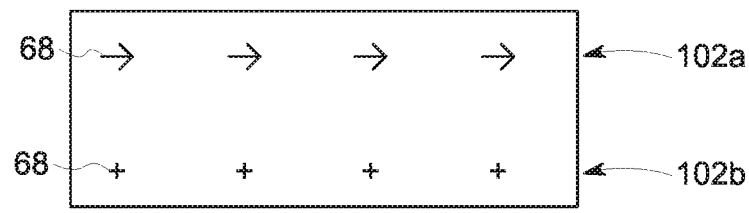
FIG. 30 is a side view of an embodiment of a jet geometry for use in the base of the foaming nozzle of FIG. 29, in accordance with an aspect of the present disclosure.

FIG. 30 is a side view of an embodiment of a jet geometry for use in the base 90 of the foaming nozzle 52 of FIG. 29. The upper row 102a includes radial swirl jets 68, and the lower row 102b includes purely radial jets 68. The upper 102a may improve radial flow of the foam bubbles away from the sides (e.g., outer surface 66) of the base 90 of the foaming nozzle 52, and the lower row 102b may improve mixing of the aerating gas and the detergent in the region above the base 90 of the foaming nozzle 52.

Figure 31:
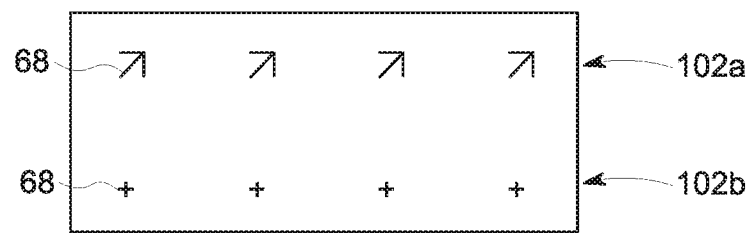
FIG. 31 is a side view of an embodiment of a jet geometry for use in the base of the foaming nozzle of FIG. 29, in accordance with an aspect of the present disclosure.

FIG. 31 is a side view of an embodiment of a jet geometry for use in the base 90 of the foaming nozzle 52 of FIG. 29. The upper row 102a includes radial swirl+axially upward jets 68, and the lower row 102b includes purely radial jets 68. This configuration may improve radial and axial flow of the foam bubbles away from the bottom surface of the nozzle 52.

Figure 32:
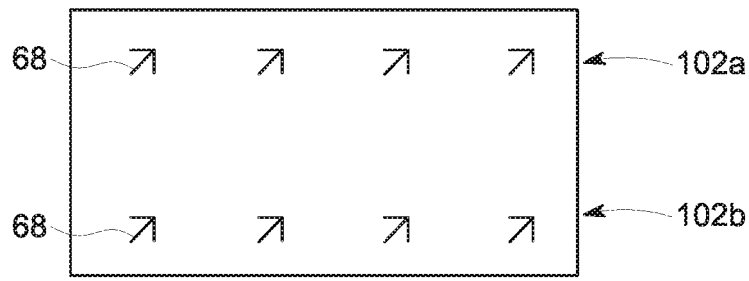
FIG. 32 is a side view of an embodiment of a jet geometry for use in the base of the foaming nozzle of FIG. 29, in accordance with an aspect of the present disclosure.

FIG. 32 is a side view of an embodiment of a jet geometry for use in the base 90 of the foaming nozzle 52 of FIG. 29. The upper row 102a includes radial swirl+axially upward jets 68, and the lower row 102b includes radial swirl+axially upward jets 68. Similar to FIG. 31, this configuration may improve radial and axial flow of the bubbles away from the bottom surface of the foaming nozzle 52.

Figure 33:
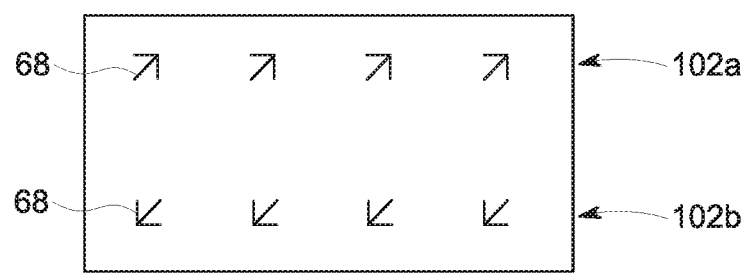
FIG. 33 is a side view of an embodiment of a jet geometry for use in the base of the foaming nozzle of FIG. 29, in accordance with an aspect of the present disclosure.

FIG. 33 is a side view of an embodiment of a jet geometry for use in the base 90 of the foaming nozzle 52 of FIG. 29. The upper row 102a includes radial swirl+axially upward jets 68, and the lower row 102b includes reverse radial swirl+axially downward jets 68. This configuration may improve flow of the bubbles (and detergent) away from the lower region of the foaming nozzle 52 adjacent to the aerating gas manifold.

Figure 34:
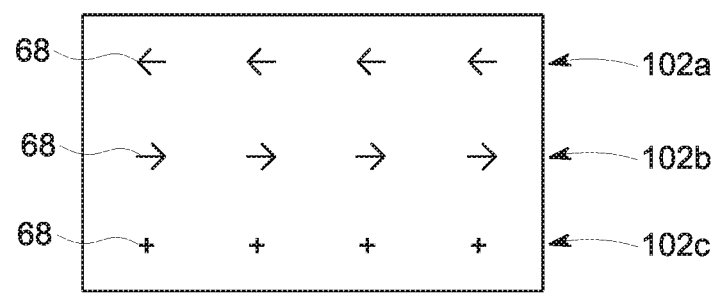
FIG. 34 is a side view of an embodiment of a jet geometry for use in the base of the foaming nozzle of FIG. 29, in accordance with an aspect of the present disclosure.

FIG. 34 is a side view of an embodiment of a jet geometry for use in the base 90 of the foaming nozzle 52 of FIG. 29. The upper row 102a includes reverse radial swirl jets 68, the middle row 102b includes radial swirl jets 68, and the lower row 102c includes purely radial jets 68. This configuration enables the lower row 102c to improve radial flow of the foam bubbles away from the side surface (e.g., outer surface 66) at the base 90 of the foaming nozzle 52, and the upper and middle rows 102a, 102b to enhance mixing of the aerating gas and detergent in the region above the base 90 of the nozzle 52.

Figure 35:
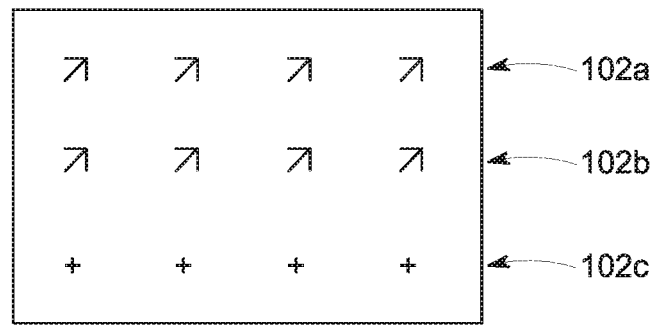
FIG. 35 is a side view of an embodiment of a jet geometry for use in the base of the foaming nozzle of FIG. 29, in accordance with an aspect of the present disclosure.

FIG. 35 is a side view of an embodiment of a jet geometry for use in the base 90 of the foaming nozzle 52 of FIG. 29. The upper row 102a includes radial swirl+axially upward jets 68, the middle row 102b includes radial swirl+axially upward jets 68, and the lower row 102c includes purely radial jets 68. This configuration may improve bubble flow upwardly and away from the base 90 of the foaming nozzle 52.

Figure 36:
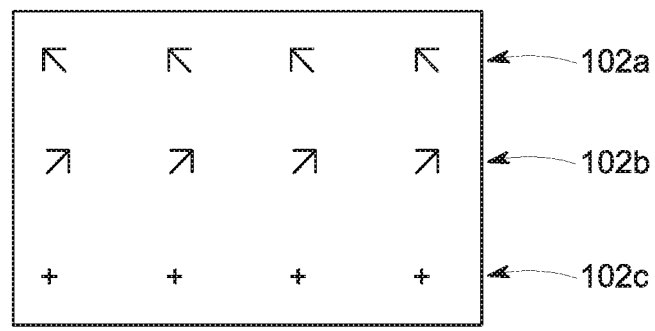
FIG. 36 is a side view of an embodiment of a jet geometry for use in the base of the foaming nozzle of FIG. 29, in accordance with an aspect of the present disclosure.

FIG. 36 is a side view of an embodiment of a jet geometry for use in the base 90 of the foaming nozzle 52 of FIG. 29. The upper row 102a includes reverse radial swirl+axially upward jets 68, the middle row 102b includes radial swirl+axially upward jets 68, and the lower row 102c includes purely radial jets 68. This configuration may improve bubble flow upwardly and away from the base 90 of the foaming nozzle 52, and the alternating directions of the upper and middle rows 102a, 102b may improve mixing (i.e., by reducing recirculation zones).

Figure 37:
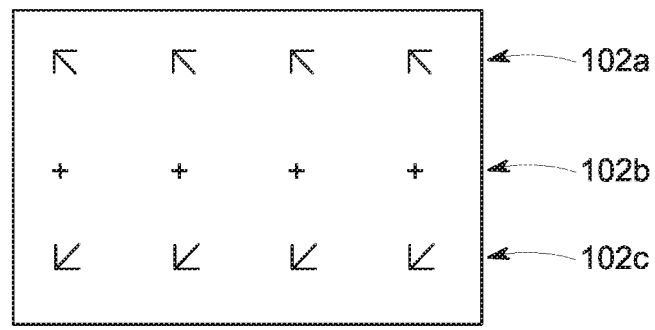
FIG. 37 is a side view of an embodiment of a jet geometry for use in the base of the foaming nozzle of FIG. 29, in accordance with an aspect of the present disclosure.

FIG. 37 is a side view of an embodiment of a jet geometry for use in the base 90 of the foaming nozzle 52 of FIG. 29. The upper row 102a includes reverse radial swirl+axially upward jets 68, the middle row 102b includes purely radial jets 68, and the lower row 102c includes reverse radial swirl+axially downward jets 68. This configuration may improve bubble flow upwardly and away from the base 90 of the foaming nozzle 52.

Figure 38:
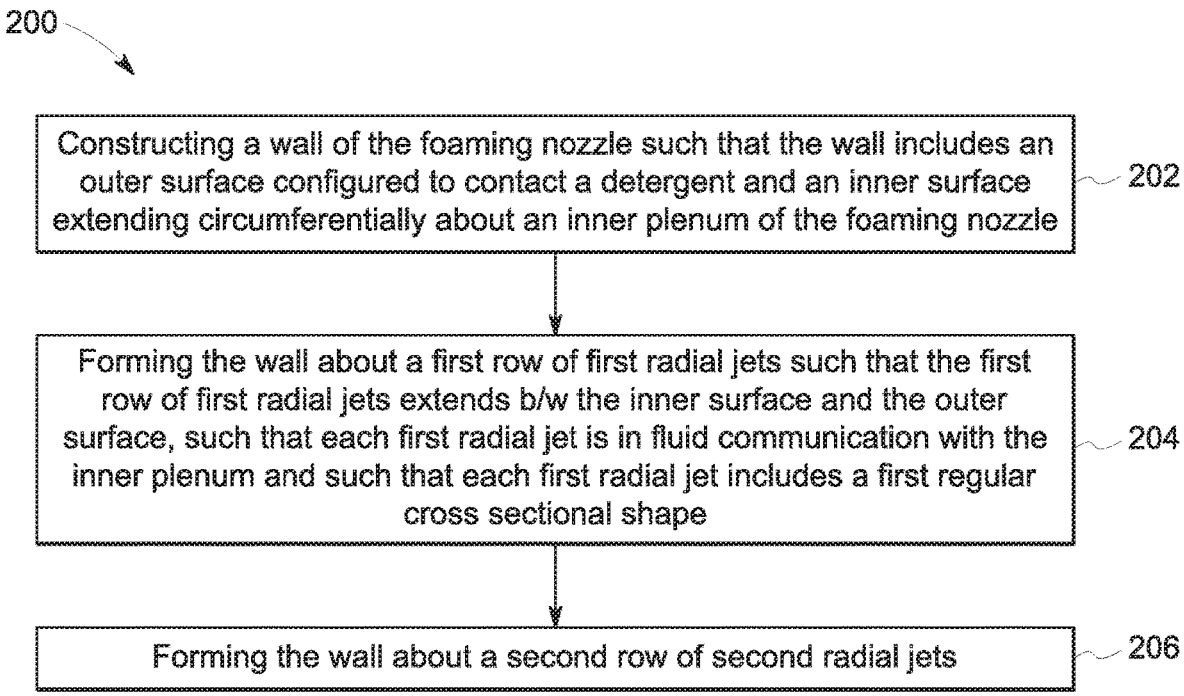
FIG. 38 is an embodiment of a method of manufacturing the foaming nozzle of FIG. 5, in accordance with an aspect of the present disclosure.

FIG. 38 is an embodiment of a method 200 of additively manufacturing a foaming nozzle of a turbine engine cleaning system. The method 200 includes constructing (block 202) a wall of the foaming nozzle such that the wall includes an inner surface extending circumferentially about an inner plenum of the foaming nozzle, and such that the wall includes an outer surface configured to contact a detergent. The inner plenum is configured to receive an aerating gas, and a thickness of the wall between the inner surface and the outer surface extends perpendicular to a longitudinal axis of the foaming nozzle.

The method 200 also includes forming (202) the wall about a first row of first radial jets such that the first row of first radial jets extends between the inner surface of the wall and the outer surface of the wall, such that the first row of first radial jets is in fluid communication with the inner plenum, and such that each first radial jet comprises a first regular cross-sectional shape.

Figure 39:
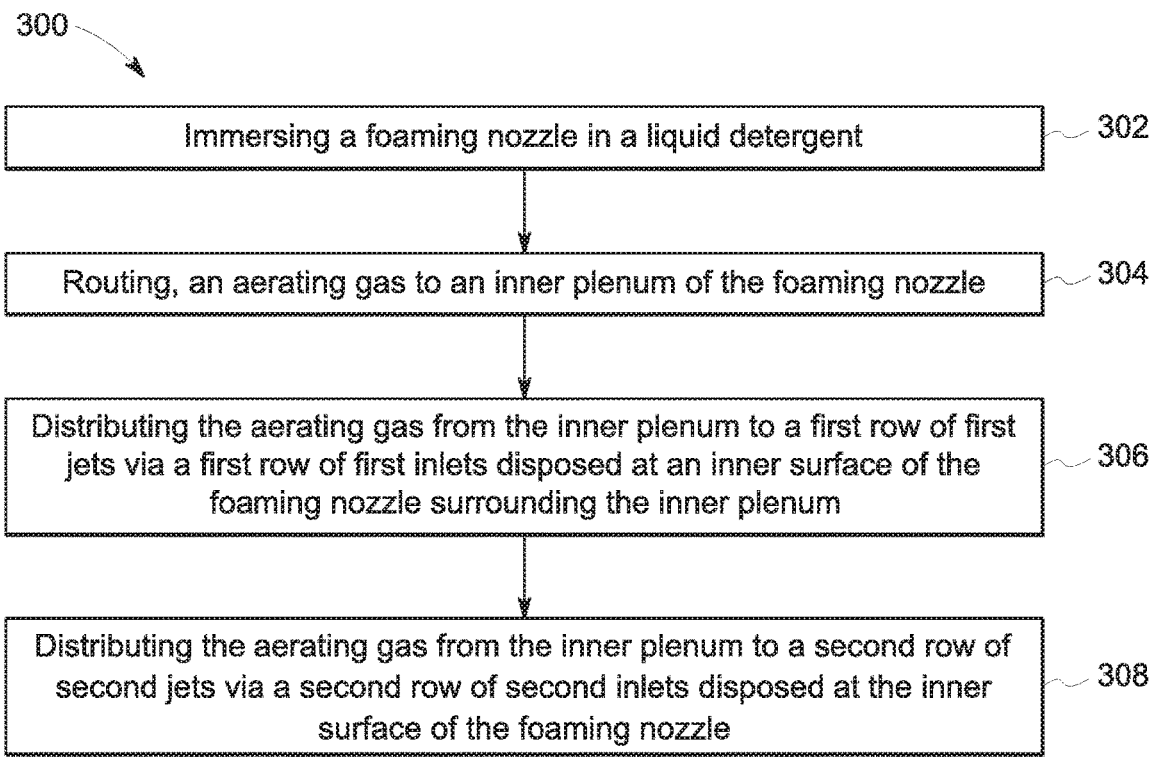
FIG. 39 is an embodiment of a method of generating foam bubbles, via the foaming nozzle of FIG. 5, for use in cleaning the turbine engine of FIG. 1, in accordance with an aspect of the present disclosure.

FIG. 39 is an embodiment of a method 300 of generating foam bubbles, via the foaming nozzle of FIG. 4, to clean the turbine engine of FIG. 2. The method 300 includes immersing (block 302) a foaming nozzle in a liquid detergent. For example, the detergent may be a water-based detergent containing citric acid. The foaming nozzle may couple with a foaming chamber (e.g., via a threaded connection). In some embodiments, the foaming chamber may include several foaming nozzles coupled thereto, and immersed (e.g., partially or fully) in the liquid detergent.

The method 300 also includes routing (block 304) an aerating gas to an inner plenum of the foaming nozzle. For example, the aerating gas may be air or nitrogen. The foaming nozzle may couple with an aerating gas storage tank which supplies the aerating gas to the inner plenum via a fan, blower, or other flow biasing device.

The method 300 also includes distributing (block 306) the aerating gas from the inner plenum to a first row of first jets via a first row of first inlets disposed at an inner surface of the foaming nozzle surrounding the inner plenum. For example, the inner plenum may be defined by an inner surface of the foaming nozzle, and a first row of first jets may extend between the inner plenum and an outer surface of the foaming nozzle. The foaming nozzle may include jet outlets at the outer surface, which enable the aerating gas to pass to an inner space of the foaming chamber containing the liquid detergent. The aerating gas aerates the liquid detergent proximate to the outlets or outer surface of the foaming nozzle. The first row of first jets may include radial components, axial components, or both, as described in detail above, which may enhance aspects of bubble generation (e.g., consistent bubble diameter, radial dispersion of bubbles, axial displacement of bubbles, mixing of the aerating gas and detergent, etc.).

The method 300 also includes distributing (block 308) the aerating gas from the inner plenum to a second row of second jets via a second row of second inlets disposed at the inner surface of the foaming nozzle. The second row of second jets is disposed axially adjacent to the first row of first jets with respect to a longitudinal axis of the foaming nozzle. The first row of first jets includes a first regular cross-sectional shape, and the second row of second radial jets includes a second regular cross-sectional shape. The first regular cross-sectional shape may be a circle, an oval, or an ellipse. Likewise, the second regular cross-sectional shape may be a circle, an oval, or an ellipse. In general, the jets of a particular row may include the same regular cross-sectional shape. However, the first regular cross-sectional shape of each of the first jets of the first row may be different than the second regular cross-sectional shape of each of the second jets of the second row. Further, in general, a particular row of jets may include the same types of radial and axial components, a different row of jets may include different types of radial and axial components, as described in detail above.

Technical effects of the invention include improved foam generation for cleaning of a gas turbine engine. For example, the disclosed foaming nozzle may be manufactured (e.g., via 3-D printing or other precision manufacturing techniques) to include aerating gas distribution jets having regularly shaped cross-sections (e.g., circles, ovals, or ellipses). The regularly shaped cross-sections improve a flow of the aerating gas through the jets, which improves aeration of the liquid detergent receiving the aerating gas. By utilizing the disclosed foaming nozzle, the bubbles forming the foam that cleans the gas turbine engine may include a more uniform distribution of diameters. In other words, the bubbles may be more consistently sized (e.g., more of the bubbles may include diameters of less than 1 millimeter, or between 0.01 and 1 millimeter, as compared to bubbles generated via traditional components/techniques).

Figure 40:
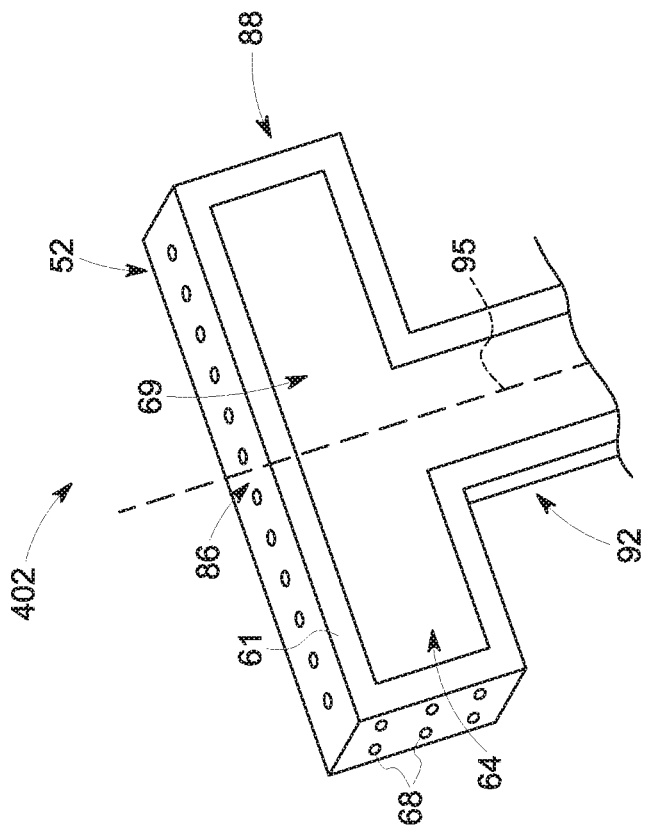
FIG. 40 includes cross-sectional perspective views illustrating embodiments of a foaming nozzle for use in cleaning the turbine engine of FIG. 1, in accordance with an aspect of the present disclosure.
Figure 40:
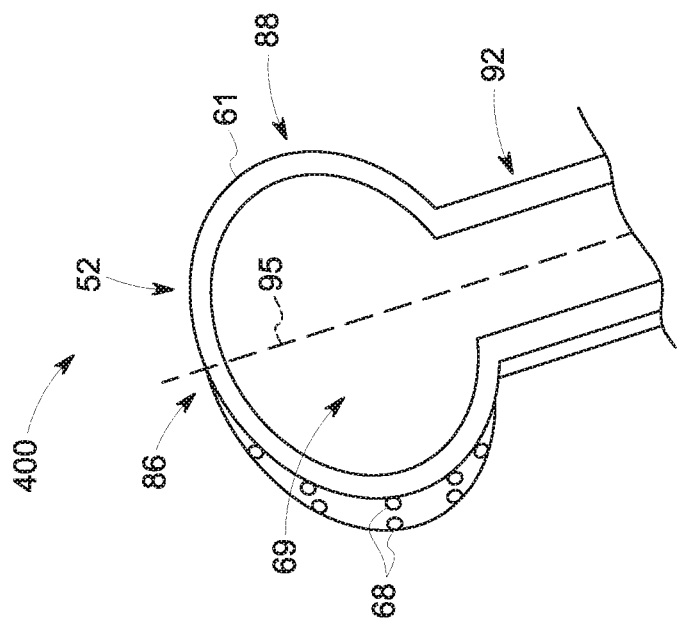

FIG. 40 includes cross-sectional perspective views illustrating embodiments of a foaming nozzle 52 for use in cleaning the turbine engine of FIG. 1. For example, a first embodiment 400 includes a spherical body 88 (and corresponding inner plenum 69). The inlet section 92 may be cylindrical, and the longitudinal axis 95 may extend from the inlet section 92 through the spherical body 88.

A second embodiment 402 includes a rectangular prism/cuboid body 88. The inlet section 92 may be cylindrical, and the longitudinal axis 95 may extend from the inlet section 92 through the rectangular prism/cuboid body 88. Other shapes are also possible. For example, a cube or triangular prism may be used.

While FIGS. 5-37, described in detail above, include embodiments having a general cylindrical shape of the foaming nozzle 52 and corresponding inner plenum 69, it should be appreciated that embodiments in accordance with the present disclosure include other shapes of a body of the foaming nozzle 52 and the inner plenum 69, such as the shapes illustrated in the embodiments 400, 402 in FIG. 40. Further, it should be appreciated that the patterns of the jets 68 described with respect to FIGS. 5-37 may be applicable to embodiments having the shapes illustrated in FIG. 40. Further still, as illustrated in FIG. 40, non-cylindrical embodiments include the longitudinal axis 95. Thus, relative positioning descriptions (e.g., of the jets 68) with respect to the longitudinal axis 95 may be applicable to the disclosed embodiments. However, it should be noted that the compatibility of the non-axisymmetric and/or non-cylindrical embodiments in FIG. 40 with the patterns of the jets 68 illustrated in (and described with respect to) FIGS. 5-37 does not preclude the possibility that the non-axisymmetric and/or non-cylindrical embodiments in FIG. 40 include differently oriented or positioned jets 68.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbine engine cleaning system comprising:
   a foaming chamber configured to receive a detergent; and
   a foaming nozzle disposed inside the foaming chamber and configured to pass an aerating gas to the foaming chamber to aerate the detergent and generate foam, wherein the foaming nozzle comprises:
      an aerating gas inlet configured to receive the aerating gas;
      a wall comprising a thickness between an outer surface of the wall and an inner surface of the wall, wherein the outer surface of the wall is configured to contact the detergent wherein the inner surface of the wall surrounds an inner plenum of the foaming nozzle, and wherein the inner plenum is configured to receive the aerating gas from the aerating gas inlet;
      a first row of first through holes configured to pass the aerating gas from the inner plenum into the foaming chamber and fluidly coupled to, and extending between, a first row of first through hole inlets at the inner surface of the wall and
      a first row of first through hole outlets at the outer surface of the wall; and
      a second row of second through holes configured to pass the aerating gas from the inner plenum into the foaming chamber and disposed axially adjacent to the first row of first through holes with respect to a longitudinal axis of the foaming nozzle, wherein the second row of second through holes is fluidly coupled to, and extending between, a second row of second through hole inlets at the inner surface of the wall and a second row of second through hole outlets at the outer surface of the wall, and wherein cross-sections of the first through holes and the second through holes comprise regular shapes; and
   a foam delivery assembly coupled to the foaming chamber and configured to route the foam to a turbine engine, wherein each first through hole comprises a radial vector and an axial vector, with respect to the longitudinal axis, between the inner surface of the foaming nozzle and the outer surface of the foaming nozzle, and wherein the axial vector is oriented upwardly toward a head portion of the foaming nozzle or downwardly toward a base of the foaming nozzle.

2. The turbine engine cleaning system of claim 1, wherein the cross-sections of the first through holes and the second through holes comprise regular circles or regular ellipses, or wherein the cross-sections of the through holes comprise a first portion of cross-sections having regular circles and a second portion of cross-sections having regular ellipses.

3. The turbine engine cleaning system of claim 1, wherein the foaming nozzle is additively manufactured such that the cross-sections of the first through holes and the second through holes comprise the regular shapes, and wherein the foaming nozzle comprises a material compatible with a temperature up to 95° C., compatible with an acidic or alkaline detergent, and compatible with organic solvents.

4. The turbine engine cleaning system of claim 1, wherein each second through hole extends linearly along a second radial plane between the inner surface and the outer surface and at a second right angle with respect to the longitudinal axis.

5. The turbine engine cleaning system of claim 1, wherein each second through hole extends linearly along a second radial plane between the inner surface and the outer surface and at a non-right angle with respect to the longitudinal axis.

6. The turbine engine cleaning system of claim 1, wherein each second through hole extends along a second radial plane between the inner surface and the outer surface and at a second non-right angle with respect to the longitudinal axis.

7. The turbine engine cleaning system of claim 6, wherein each second through hole extends at the second non-right angle in a counterclockwise direction.

8. The turbine engine cleaning system of claim 6, wherein each second through hole extends at the second non-right angle in the clockwise direction.

9. The turbine engine cleaning system of claim 1, wherein the foaming nozzle comprises the head portion positioned above the inner plenum, wherein a plurality of axial through holes extends upwardly from the inner plenum and through a plurality of axial outlets at a top surface of the head portion of the foaming nozzle, and wherein the plurality of axial through holes are arranged in cylindrical columns evenly spaced apart from each other.

10. The turbine engine cleaning system of claim 1, wherein the foaming nozzle comprises the head portion positioned above the inner plenum, wherein a plurality of axial through holes extends upwardly from the inner plenum and through a plurality of axial outlets at a top surface of the head portion of the foaming nozzle, wherein the plurality of axial through holes is arranged in at least a first cylindrical column, a second cylindrical column, and a third cylindrical column, and wherein a radial spacing between the first cylindrical column and the second cylindrical column is different than an additional radial spacing between the second cylindrical column and the third cylindrical column.

11. The turbine engine cleaning system of claim 1, wherein the first row of first through holes outlets is disposed between 1 millimeter and 3 millimeters axially away, as measured along the longitudinal axis, from the second row of second through hole outlets.

12. The turbine engine cleaning system of claim 1, comprising a third row of third through holes fluidly coupled to, and extending between, a third row of third through hole inlets at the inner surface of the wall and a third row of third through hole outlets at the outer surface of the wall, wherein the third row of third through holes is positioned axially adjacent to the second row of second through holes with respect to the longitudinal axis, wherein each second through hole extends linearly along a second radial plane between the inner surface and the outer surface and at a second right angle with respect to the longitudinal axis, and wherein each third through hole extends linearly along a third radial plane and at a third non-right angle with respect to the longitudinal axis.

13. The turbine engine cleaning system of claim 1, wherein the turbine engine cleaning system comprises:
a detergent storage tank configured to store the detergent;
an aerating gas storage tank configured to store the aerating gas; or
any combination thereof.

14. The turbine engine cleaning system of claim 1, wherein the inner plenum comprises an axisymmetric shape.

15. A foaming nozzle for a turbine engine cleaning system, comprising:
a first axial end and a second axial end;
an aerating gas inlet formed in the first axial end and configured to receive an aerating gas, wherein the aerating gas inlet is configured to be coupled to a foaming chamber;
a wall extending from the first axial end to the second axial end and comprising a thickness between an outer surface of the wall and an inner surface of the wall, wherein the outer surface of the wall is configured to contact a detergent in which the foaming nozzle is configured to be disposed, wherein the inner surface of the wall surrounds an inner plenum of the foaming nozzle, and wherein the inner plenum is configured to receive the aerating gas from the aerating gas inlet;
a first row of first through holes fluidly coupled to, and extending between, a first row of first through hole inlets at the inner surface of the wall and a first row of first through hole outlets at the outer surface of the wall; and
a second row of second through holes disposed axially adjacent to the first row of first through holes with respect to a longitudinal axis of the foaming nozzle, wherein the second row of second through holes is fluidly coupled to, and extending between, a second row of second through hole inlets at the inner surface of the wall and a second row of second through hole outlets at the outer surface of the wall, wherein cross-sections of the first through holes and the second through holes comprise regular shapes, wherein the first through holes and the second through holes are configured to output the aerating gas from the inner plenum into the foaming chamber, wherein the foaming nozzle comprises a head portion positioned above the inner plenum, wherein a plurality of axial through holes extends upwardly from the inner plenum and through a plurality of axial outlets at a top surface of the head portion of the foaming nozzle, wherein the plurality of axial through holes is arranged in at least a first cylindrical column, a second cylindrical column, and a third cylindrical column, and wherein a radial spacing between the first cylindrical column and the second cylindrical column is different than an additional radial spacing between the second cylindrical column and the third cylindrical column.

16. The foaming nozzle of claim 15, wherein the cross-sections of the first through holes and the second through holes comprise regular circles or regular ellipses, or wherein the cross-sections of the through holes comprise a first portion of cross-sections having regular circles and a second portion of cross-sections having regular ellipses.

17. The foaming nozzle of claim 15, wherein each first through hole extends linearly along a first radial plane between the inner surface and the outer surface and at a first right angle with respect to the longitudinal axis, and wherein each second through hole extends linearly along a second radial plane between the inner surface and the outer surface and at a second right angle with respect to the longitudinal axis.

18. The foaming nozzle of claim 15, wherein each first through hole extends linearly along a first radial plane between the inner surface and the outer surface and at a first right angle with respect to the longitudinal axis, and wherein each second through hole extends linearly along a second radial plane between the inner surface and the outer surface and at a non-right angle with respect to the longitudinal axis.

19. The foaming nozzle of claim 15, wherein each first through hole extends along a first radial plane between the inner surface and the outer surfaced and at a first non-right angle with respect to the longitudinal axis, and wherein each second through hole extends along a second radial plane between the inner surfaced and the outer surface and at a second non-right angle with respect to the longitudinal axis.

20. The foaming nozzle of claim 19, wherein each first through hole extends at the first non-right angle in a clockwise direction, and wherein each second through hole extends at the second non-right angle in a counterclockwise direction.

21. The foaming nozzle of claim 19, wherein each first through hole extends at the first non-right angle in a clockwise direction, and wherein each second through hole extends at the second non-right angle in the clockwise direction.

22. The foaming nozzle of claim 15, wherein each first through hole comprises a radial vector and an axial vector, with respect to the longitudinal axis, between the inner surface of the foaming nozzle and the outer surface of the foaming nozzle.

23. The foaming nozzle of claim 22, wherein the axial vector is oriented upwardly toward the head portion of the foaming nozzle or downwardly toward a base of the foaming nozzle.

24. The foaming nozzle of claim 15, wherein the first row of first through hole outlets is disposed between 1 millimeter and 3 millimeters axially away, as measured along the longitudinal axis, from the second row of second through hole outlets.

25. A turbine engine cleaning system comprising:
a foaming chamber configured to receive a detergent; and
a foaming nozzle disposed inside the foaming chamber and configured to pass an aerating gas to the foaming chamber to aerate the detergent and generate foam, wherein the foaming nozzle comprises:
an aerating gas inlet configured to receive the aerating gas;
a wall comprising a thickness between an outer surface of the wall and an inner surface of the wall, wherein the outer surface of the wall is configured to contact the detergent wherein the inner surface of the wall surrounds an inner plenum of the foaming nozzle, and wherein the inner plenum is configured to receive the aerating gas from the aerating gas inlet;
a first row of first through holes configured to pass the aerating gas from the inner plenum into the foaming chamber and fluidly coupled to, and extending between, a first row of first through hole inlets at the inner surface of the wall and
a first row of first through hole outlets at the outer surface of the wall; and
a second row of second through holes configured to pass the aerating gas from the inner plenum into the foaming chamber and disposed axially adjacent to
the first row of first through holes with respect to a longitudinal axis of the foaming nozzle, wherein the second row of second through holes is fluidly coupled to, and extending between, a second row of second through hole inlets at the inner surface of the wall and a second row of second through hole outlets at the outer surface of the wall, and wherein cross-sections of the first through holes and the second through holes comprise regular shapes; and
a foam delivery assembly coupled to the foaming chamber and configured to route the foam to a turbine engine, wherein the foaming nozzle comprises a head portion positioned above the inner plenum, wherein a plurality of axial through holes extends upwardly from the inner plenum and through a plurality of axial outlets at a top surface of the head portion of the foaming nozzle, and wherein the plurality of axial through holes are arranged in cylindrical columns evenly spaced apart from each other.

\* \* \* \* \*